United States Patent
Perkins

(10) Patent No.: US 7,800,823 B2
(45) Date of Patent: *Sep. 21, 2010

(54) POLARIZATION DEVICE TO POLARIZE AND FURTHER CONTROL LIGHT

(75) Inventor: Raymond T. Perkins, Orem, UT (US)

(73) Assignee: Moxtek, Inc., Orem, UT (US)

(*) Notice: Subject to any disclaimer, the term of this patent is extended or adjusted under 35 U.S.C. 154(b) by 864 days.

This patent is subject to a terminal disclaimer.

(21) Appl. No.: 11/640,112

(22) Filed: Dec. 15, 2006

(65) Prior Publication Data

US 2008/0266662 A1    Oct. 30, 2008

Related U.S. Application Data

(63) Continuation-in-part of application No. 11/005,927, filed on Dec. 6, 2004, now Pat. No. 7,570,424.

(51) Int. Cl.
*G02B 5/30* (2006.01)

(52) U.S. Cl. .................. 359/486; 359/495; 359/576

(58) Field of Classification Search .................. None
See application file for complete search history.

(56) References Cited

U.S. PATENT DOCUMENTS

| | | | |
|---|---|---|---|
| 2,224,214 A | 12/1940 | Brown | |
| 2,237,567 A | 4/1941 | Land | |
| 2,287,598 A | 6/1942 | Brown | |
| 2,391,451 A | 12/1945 | Fischer | |
| 2,403,731 A | 7/1946 | MacNeille | |
| 2,605,352 A | 7/1952 | Fishcer | |
| 2,748,659 A | 6/1956 | Geffcken et al. | |
| 2,813,146 A | 11/1957 | Glenn | |
| 2,815,452 A | 12/1957 | Mertz | |
| 2,887,566 A | 5/1959 | Marks | |
| 3,046,839 A | 7/1962 | Bird et al. | |
| 3,084,590 A | 4/1963 | Glenn, Jr. | |
| 3,202,039 A | 8/1965 | Lang et al. | |
| 3,235,630 A | 2/1966 | Doherty et al. | |
| 3,291,550 A | 12/1966 | Bird et al. | |

(Continued)

FOREIGN PATENT DOCUMENTS

CN    03815026.3    8/2005

(Continued)

OTHER PUBLICATIONS

G. R. Bird, M. Parrish, Jr., 'The wire grid as a near-infrared polarizer', J. Opt. Soc. Am., vol. 50, No. 9, Sep. 1960, pp. 886-891.*

(Continued)

*Primary Examiner*—Arnel C Lavarias
(74) *Attorney, Agent, or Firm*—Thorpe North & Western, LLP

(57) ABSTRACT

A polarization device includes an optical stack with a diffraction grating and a wire grid polarizer with one disposed over the other. The wire grid polarizer includes an array of elongated, parallel conductive wires in accordance with $P_{WGP} < \lambda/2$ where $P_{WGP}$ is the period of the wires and $\lambda$ is the wavelength of the light. The diffraction grating includes an array of elongated parallel dielectric ribs in accordance with $P_{DG} > \lambda/2$ where $P_{DG}$ is the period of the ribs.

23 Claims, 12 Drawing Sheets

U.S. PATENT DOCUMENTS

| | | |
|---|---|---|
| 3,291,871 A * | 12/1966 | Francis ............ 264/1.31 |
| 3,293,331 A * | 12/1966 | Doherty ............ 264/1.31 |
| 3,436,143 A | 4/1969 | Garrett |
| 3,479,168 A | 11/1969 | Bird et al. |
| 3,536,373 A | 10/1970 | Bird et al. |
| 3,566,099 A | 2/1971 | Makas |
| 3,627,431 A | 12/1971 | Komarniski |
| 3,631,288 A | 12/1971 | Rogers |
| 3,731,986 A | 5/1973 | Fergason |
| 3,857,627 A | 12/1974 | Harsch |
| 3,857,628 A | 12/1974 | Strong |
| 3,876,285 A | 4/1975 | Schwarzmüller |
| 3,877,789 A | 4/1975 | Marie |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,068,260 A | 1/1978 | Ohneda et al. |
| 4,073,571 A | 2/1978 | Grinberg et al. |
| 4,104,598 A | 8/1978 | Abrams |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,308,079 A | 12/1981 | Venables et al. |
| 4,441,791 A | 4/1984 | Hornbeck |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A * | 4/1985 | Sriram et al. ............ 359/352 |
| 4,514,479 A | 4/1985 | Ferrante |
| 4,515,441 A | 5/1985 | Wentz |
| 4,515,443 A | 5/1985 | Bly |
| 4,532,619 A | 7/1985 | Sugiyama et al. |
| 4,560,599 A | 12/1985 | Regan |
| 4,679,910 A | 7/1987 | Efron et al. |
| 4,688,897 A | 8/1987 | Grinberg et al. |
| 4,701,028 A | 10/1987 | Clerc et al. |
| 4,711,530 A | 12/1987 | Nakanowatari et al. |
| 4,712,881 A | 12/1987 | Shurtz et al. |
| 4,724,436 A | 2/1988 | Johansen et al. |
| 4,743,092 A | 5/1988 | Pistor |
| 4,743,093 A | 5/1988 | Oinen |
| 4,759,611 A | 7/1988 | Downey, Jr. |
| 4,759,612 A | 7/1988 | Nakatsuka et al. |
| 4,795,233 A | 1/1989 | Chang |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,895,769 A | 1/1990 | Land et al. |
| 4,904,060 A | 2/1990 | Grupp |
| 4,913,529 A | 4/1990 | Goldenberg et al. |
| 4,915,463 A | 4/1990 | Barbee, Jr. |
| 4,939,526 A | 7/1990 | Tsuda |
| 4,946,231 A | 8/1990 | Pistor |
| 4,966,438 A | 10/1990 | Mouchart et al. |
| 4,991,937 A | 2/1991 | Urino |
| 5,029,988 A | 7/1991 | Urino |
| 5,039,185 A | 8/1991 | Uchida et al. |
| 5,061,050 A | 10/1991 | Ogura |
| 5,087,985 A | 2/1992 | Kitaura et al. |
| 5,092,774 A | 3/1992 | Milan |
| 5,113,285 A | 5/1992 | Franklin et al. |
| 5,122,887 A | 6/1992 | Mathewson |
| 5,122,907 A | 6/1992 | Slocum |
| 5,139,340 A | 8/1992 | Okumura |
| 5,157,526 A | 10/1992 | Kondo et al. |
| 5,177,635 A | 1/1993 | Keilmann |
| 5,196,926 A | 3/1993 | Lee |
| 5,196,953 A | 3/1993 | Yeh et al. |
| 5,204,765 A | 4/1993 | Mitsui et al. |
| 5,206,674 A | 4/1993 | Puech et al. |
| 5,216,539 A | 6/1993 | Boher et al. |
| 5,222,907 A | 6/1993 | Katabuchi et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,279,689 A | 1/1994 | Shvartsman |
| 5,295,009 A | 3/1994 | Barnik et al. |
| 5,298,199 A | 3/1994 | Hirose et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,387,953 A | 2/1995 | Minoura et al. |
| 5,391,091 A | 2/1995 | Nations |
| 5,422,756 A | 6/1995 | Weber |
| 5,436,761 A | 7/1995 | Kamon |
| 5,455,589 A | 10/1995 | Huguenin et al. |
| 5,466,319 A | 11/1995 | Zager et al. |
| 5,477,359 A | 12/1995 | Okazaki |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,499,126 A | 3/1996 | Abileah et al. |
| 5,504,603 A | 4/1996 | Winker et al. |
| 5,506,704 A | 4/1996 | Broer et al. |
| 5,508,830 A | 4/1996 | Imoto et al. |
| 5,510,215 A | 4/1996 | Prince et al. |
| 5,513,023 A | 4/1996 | Fritz et al. |
| 5,513,035 A | 4/1996 | Miyatake et al. |
| 5,517,356 A | 5/1996 | Araujo et al. |
| 5,535,047 A | 7/1996 | Hornbeck |
| 5,548,427 A | 8/1996 | May |
| 5,555,186 A | 9/1996 | Sjopua |
| 5,557,343 A | 9/1996 | Yamagishi |
| 5,559,634 A | 9/1996 | Weber |
| 5,570,213 A | 10/1996 | Ruiz et al. |
| 5,570,215 A | 10/1996 | Omae et al. |
| 5,574,580 A | 11/1996 | Ansley |
| 5,576,854 A | 11/1996 | Schmidt et al. |
| 5,579,138 A | 11/1996 | Sannohe et al. |
| 5,594,561 A | 1/1997 | Blanchard |
| 5,600,383 A | 2/1997 | Hornbeck |
| 5,609,939 A | 3/1997 | Petersen et al. |
| 5,612,820 A | 3/1997 | Schrenk et al. |
| 5,619,352 A | 4/1997 | Koch et al. |
| 5,619,356 A | 4/1997 | Kozo et al. |
| 5,620,755 A | 4/1997 | Smith, Jr. et al. |
| 5,626,408 A | 5/1997 | Heynderickx et al. |
| 5,638,197 A | 6/1997 | Gunning, III et al. |
| 5,652,667 A | 7/1997 | Kurogane |
| 5,658,060 A | 8/1997 | Dove |
| 5,686,979 A | 11/1997 | Weber et al. |
| 5,706,063 A | 1/1998 | Hong |
| 5,719,695 A | 2/1998 | Heimbuch |
| 5,731,246 A | 3/1998 | Bakeman et al. |
| 5,748,368 A | 5/1998 | Tamada et al. |
| 5,748,369 A | 5/1998 | Yokota |
| 5,751,388 A | 5/1998 | Larson |
| 5,751,466 A | 5/1998 | Dowling et al. |
| 5,767,827 A | 6/1998 | Kobayashi et al. |
| 5,798,819 A | 8/1998 | Hattori et al. |
| 5,808,795 A | 9/1998 | Shimomura et al. |

| | | |
|---|---|---|
| 5,826,959 A | 10/1998 | Atsuchi |
| 5,826,960 A | 10/1998 | Gotoh et al. |
| 5,828,489 A | 10/1998 | Johnson et al. |
| 5,833,360 A | 11/1998 | Knox et al. |
| 5,838,403 A | 11/1998 | Jannson et al. |
| 5,841,494 A | 11/1998 | Hall |
| 5,844,722 A | 12/1998 | Stephens et al. |
| 5,886,754 A | 3/1999 | Kuo |
| 5,890,095 A | 3/1999 | Barbour et al. |
| 5,898,521 A | 4/1999 | Okada |
| 5,899,551 A | 5/1999 | Neijzen et al. |
| 5,900,976 A | 5/1999 | Handschy et al. |
| 5,907,427 A | 5/1999 | Scalora et al. |
| 5,912,762 A | 6/1999 | Li et al. |
| 5,914,818 A | 6/1999 | Tejada et al. |
| 5,917,562 A | 6/1999 | Woodgate et al. |
| 5,918,961 A | 7/1999 | Ueda |
| 5,930,050 A | 7/1999 | Dewald |
| 5,943,171 A | 8/1999 | Budd et al. |
| 5,958,345 A | 9/1999 | Turner et al. |
| 5,965,247 A | 10/1999 | Jonza et al. |
| 5,969,861 A | 10/1999 | Ueda et al. |
| 5,973,833 A | 10/1999 | Booth et al. |
| 5,978,056 A | 11/1999 | Shintani et al. |
| 5,982,541 A | 11/1999 | Li et al. |
| 5,986,730 A | 11/1999 | Hansen et al. |
| 5,991,075 A | 11/1999 | Katsuragawa et al. |
| 5,991,077 A | 11/1999 | Carlson et al. |
| 6,005,918 A | 12/1999 | Harris et al. |
| 6,008,951 A | 12/1999 | Anderson |
| 6,010,121 A | 1/2000 | Lee |
| 6,016,173 A | 1/2000 | Crandall |
| 6,018,841 A | 2/2000 | Kelsay et al. |
| 6,053,616 A | 4/2000 | Fujimorie et al. |
| 6,055,103 A | 4/2000 | Woodgate et al. |
| 6,056,407 A | 5/2000 | Iinuma et al. |
| 6,062,694 A | 5/2000 | Oikawa et al. |
| 6,075,235 A | 6/2000 | Chun |
| 6,081,312 A | 6/2000 | Aminaka et al. |
| 6,081,376 A | 6/2000 | Hansen et al. |
| 6,082,861 A | 7/2000 | Dove et al. |
| 6,089,717 A | 7/2000 | Iwai |
| 6,096,155 A | 8/2000 | Harden et al. |
| 6,096,375 A | 8/2000 | Ouderkirk et al. |
| 6,108,131 A | 8/2000 | Hansen et al. |
| 6,122,103 A | 9/2000 | Perkins et al. |
| 6,141,075 A | 10/2000 | Ohmuro et al. |
| 6,147,728 A | 11/2000 | Okumura et al. |
| 6,172,813 B1 | 1/2001 | Tadic-Galeb et al. |
| 6,172,816 B1 | 1/2001 | Tadic-Galeb et al. |
| 6,181,386 B1 | 1/2001 | Knox |
| 6,208,463 B1 | 3/2001 | Hansen et al. |
| 6,215,547 B1 | 4/2001 | Ramanugan et al. |
| 6,234,634 B1 | 5/2001 | Hansen et al. |
| 6,243,199 B1 | 6/2001 | Hansen et al. |
| 6,247,816 B1 | 6/2001 | Cipolla et al. |
| 6,249,378 B1 | 6/2001 | Shimamura et al. |
| 6,250,762 B1 | 6/2001 | Kuijper |
| 6,251,297 B1 | 6/2001 | Komuro et al. |
| 6,282,025 B1 | 8/2001 | Huang et al. |
| 6,288,840 B1 | 9/2001 | Perkins et al. |
| 6,310,345 B1 | 10/2001 | Pittman et al. |
| 6,339,454 B1 | 1/2002 | Knox |
| 6,340,230 B1 | 1/2002 | Bryars et al. |
| 6,345,895 B1 | 2/2002 | Maki et al. |
| 6,348,995 B1 | 2/2002 | Hansen et al. |
| 6,375,330 B1 | 4/2002 | Mihalakis |
| 6,398,364 B1 | 6/2002 | Bryars |
| 6,406,151 B1 | 6/2002 | Fujimori |
| 6,409,525 B1 | 6/2002 | Hoelscher et al. |
| 6,424,436 B1 | 7/2002 | Yamanaka |
| 6,426,837 B1 | 7/2002 | Clark et al. |
| 6,447,120 B1 | 9/2002 | Hansen et al. |
| 6,452,724 B1 | 9/2002 | Hansen et al. |
| 6,460,998 B1 | 10/2002 | Watanabe |
| 6,486,997 B1 | 11/2002 | Bruzzone et al. |
| 6,496,239 B2 | 12/2002 | Seiberle |
| 6,496,287 B1 | 12/2002 | Seiberle et al. |
| 6,511,183 B2 | 1/2003 | Shimizu et al. |
| 6,520,645 B2 | 2/2003 | Yamamoto et al. |
| 6,532,111 B2 | 3/2003 | Kurtz et al. |
| 6,547,396 B1 | 4/2003 | Svardal et al. |
| 6,580,471 B2 | 6/2003 | Knox |
| 6,583,930 B1 | 6/2003 | Schrenk et al. |
| 6,585,378 B2 | 7/2003 | Kurtz et al. |
| 0,156,325 A1 | 8/2003 | Hoshl |
| 6,624,936 B2 | 9/2003 | Kotchick et al. |
| 6,643,077 B2 | 11/2003 | Magarill et al. |
| 6,661,475 B1 | 12/2003 | Stahl et al. |
| 6,661,484 B1 | 12/2003 | Iwai et al. |
| 6,665,119 B1 | 12/2003 | Kurtz et al. |
| 6,666,556 B2 | 12/2003 | Hansen et al. |
| 6,669,343 B2 | 12/2003 | Shahzad et al. |
| 6,698,891 B2 | 3/2004 | Kato |
| 6,704,469 B1 | 3/2004 | Xie et al. |
| 6,710,921 B2 | 3/2004 | Hansen et al. |
| 6,714,350 B2 | 3/2004 | Silverstein et al. |
| 6,721,096 B2 | 4/2004 | Bruzzone et al. |
| 6,764,181 B2 | 7/2004 | Magarill et al. |
| 6,769,779 B1 | 8/2004 | Ehrne et al. |
| 6,781,640 B1 | 8/2004 | Hunag |
| 6,785,050 B2 | 8/2004 | Lines et al. |
| 6,788,461 B2 | 9/2004 | Kurtz et al. |
| 6,805,445 B2 | 10/2004 | Silverstein et al. |
| 6,809,864 B2 | 10/2004 | Martynov et al. |
| 6,811,274 B2 | 11/2004 | Olczak |
| 6,813,077 B2 | 11/2004 | Borrelli et al. |
| 6,816,290 B2 | 11/2004 | Mukawa |
| 6,821,135 B1 | 11/2004 | Martin |
| 6,823,093 B2 | 11/2004 | Chang et al. |
| 6,829,090 B2 | 12/2004 | Katsumata et al. |
| 6,844,971 B2 | 1/2005 | Silverstein et al. |
| 6,846,089 B2 | 1/2005 | Stevenson et al. |
| 6,859,303 B2 | 2/2005 | Wang et al. |
| 6,876,784 B2 | 4/2005 | Nikolov et al. |
| 6,896,371 B2 | 5/2005 | Shimizu et al. |
| 6,897,926 B2 | 5/2005 | Mi et al. |
| 6,899,440 B2 | 5/2005 | Bierhuizen |
| 6,900,866 B2 | 5/2005 | Kurtz et al. |
| 6,909,473 B2 | 6/2005 | Mi et al. |
| 6,920,272 B2 | 7/2005 | Wang |
| 6,922,287 B2 | 7/2005 | Wiki et al. |
| 6,926,410 B2 | 8/2005 | Weber et al. |
| 6,927,915 B2 | 8/2005 | Nakai |
| 6,934,082 B2 | 8/2005 | Allen et al. |
| 0,195,485 A1 | 9/2005 | Hirai et al. |
| 6,954,245 B2 | 10/2005 | Mi et al. |
| 6,972,906 B2 | 12/2005 | Hasman et al. |
| 6,976,759 B2 | 12/2005 | Magarill et al. |
| 6,981,771 B1 | 1/2006 | Arai et al. |
| 7,013,064 B2 | 3/2006 | Wang |
| 7,023,512 B2 | 4/2006 | Kurtz et al. |
| 7,023,602 B2 | 4/2006 | Aastuen et al. |
| 7,025,464 B2 | 4/2006 | Beeson et al. |
| 7,046,422 B2 | 5/2006 | Kimura et al. |
| 7,046,441 B2 | 5/2006 | Huang et al. |
| 7,046,442 B2 | 5/2006 | Suganuma |
| 7,050,233 B2 | 5/2006 | Nikolov et al. |
| 0,127,829 A1 | 6/2006 | Deng et al. |
| 7,075,722 B2 | 7/2006 | Nakai |
| 7,113,335 B2 | 9/2006 | Sales |
| 7,131,737 B2 | 11/2006 | Silverstein et al. |
| 7,142,363 B2 | 11/2006 | Sato et al. |
| 7,155,073 B2 | 12/2006 | Momoki et al. |
| 7,158,302 B2 | 1/2007 | Chiu et al. |
| 7,159,987 B2 | 1/2007 | Sakata |

| | | |
|---|---|---|
| 7,177,259 B2 | 2/2007 | Nishi et al. |
| 7,185,984 B2 | 3/2007 | Akiyama |
| 7,213,920 B2 | 5/2007 | Matsui et al. |
| 7,221,420 B2 | 5/2007 | Silverstein et al. |
| 7,221,501 B2 | 5/2007 | Flagello et al. |
| 7,230,766 B2 | 6/2007 | Rogers |
| 7,234,816 B2 | 6/2007 | Bruzzone et al. |
| 7,236,655 B2 | 6/2007 | Momoki et al. |
| 7,255,444 B2 | 8/2007 | Nakashima et al. |
| 7,256,938 B2 | 8/2007 | Barton et al. |
| 7,630,133 B2 * | 12/2009 | Perkins ................ 359/486 |
| 2001/0006421 A1 | 7/2001 | Parriaux |
| 2001/0022687 A1 | 9/2001 | Takahashi et al. |
| 2002/0001128 A1 | 1/2002 | Moseley et al. |
| 2002/0040892 A1 | 4/2002 | Koyama et al. |
| 2002/0122235 A1 | 9/2002 | Kurtz et al. |
| 2002/0167727 A1 | 11/2002 | Hansen et al. |
| 2002/0176166 A1 | 11/2002 | Schuster |
| 2002/0181824 A1 | 12/2002 | Huang et al. |
| 2002/0191286 A1 | 12/2002 | Gale et al. |
| 2003/0058408 A1 | 3/2003 | Magarill et al. |
| 2003/0072079 A1 | 4/2003 | Silverstein et al. |
| 2003/0081178 A1 | 5/2003 | Shimizu et al. |
| 2003/0081179 A1 | 5/2003 | Pentico et al. |
| 2003/0117708 A1 | 6/2003 | Kane |
| 2003/0161029 A1 | 8/2003 | Kurtz et al. |
| 2003/0180024 A1 | 9/2003 | Edlinger |
| 2003/0193652 A1 | 10/2003 | Pentico et al. |
| 2003/0202157 A1 | 10/2003 | Pentico et al. |
| 2003/0218722 A1 | 11/2003 | Tsao et al. |
| 2003/0223118 A1 | 12/2003 | Sakamoto |
| 2003/0223670 A1 | 12/2003 | Nikolov et al. |
| 2004/0008416 A1 | 1/2004 | Okuno |
| 2004/0042101 A1 | 3/2004 | Wang et al. |
| 2004/0047039 A1 | 3/2004 | Wang et al. |
| 2004/0047388 A1 | 3/2004 | Wang et al. |
| 2004/0051928 A1 | 3/2004 | Mi |
| 2004/0070829 A1 | 4/2004 | Kurtz et al. |
| 2004/0071425 A1 | 4/2004 | Wang |
| 2004/0095637 A1 | 5/2004 | Nikolov et al. |
| 2004/0120041 A1 | 6/2004 | Silverstein et al. |
| 2004/0125449 A1 | 7/2004 | Sales |
| 2004/0165126 A1 | 8/2004 | Ooi et al. |
| 2004/0174596 A1 | 9/2004 | Umeki |
| 2004/0201889 A1 | 10/2004 | Wang et al. |
| 2004/0201890 A1 | 10/2004 | Crosby |
| 2004/0218270 A1 | 11/2004 | Wang |
| 2004/0227994 A1 | 11/2004 | Ma et al. |
| 2004/0233362 A1 | 11/2004 | Kashima |
| 2004/0240777 A1 | 12/2004 | Woodgate et al. |
| 2004/0258355 A1 | 12/2004 | Wang et al. |
| 2005/0045799 A1 | 3/2005 | Deng et al. |
| 2005/0046941 A1 | 3/2005 | Satoh et al. |
| 2005/0078374 A1 | 4/2005 | Tairo et al. |
| 2005/0084613 A1 | 4/2005 | Wang et al. |
| 2005/0088739 A1 | 4/2005 | Chiu et al. |
| 2005/0122587 A1 | 6/2005 | Ouderkirk et al. |
| 2005/0128567 A1 | 6/2005 | Wang et al. |
| 2005/0128587 A1 | 6/2005 | Suganuma |
| 2005/0152033 A1 | 7/2005 | Kang et al. |
| 2005/0179995 A1 | 8/2005 | Nikolov et al. |
| 2005/0180014 A1 | 8/2005 | Nikolov et al. |
| 2005/0181128 A1 | 8/2005 | Nikolov et al. |
| 2005/0190445 A1 | 9/2005 | Fukuzaki |
| 2005/0201656 A1 | 9/2005 | Nikolov et al. |
| 2005/0213043 A1 | 9/2005 | Nakashima et al. |
| 2005/0259324 A1 | 11/2005 | Flagello et al. |
| 2005/0271091 A1 | 12/2005 | Wang |
| 2005/0275944 A1 | 12/2005 | Wang et al. |
| 2005/0277063 A1 | 12/2005 | Wang et al. |
| 2006/0001969 A1 | 1/2006 | Wang et al. |
| 2006/0061862 A1 | 3/2006 | Mi et al. |
| 2006/0072074 A1 | 4/2006 | Matsui et al. |
| 2006/0072194 A1 | 4/2006 | Lee |
| 2006/0092513 A1 | 5/2006 | Momoki |
| 2006/0113279 A1 | 6/2006 | Little |
| 2006/0118514 A1 | 6/2006 | Little et al. |
| 2006/0119937 A1 | 6/2006 | Perkins |
| 2006/0187416 A1 | 8/2006 | Ouchi et al. |
| 2006/0215263 A1 | 9/2006 | Mi et al. |
| 2006/0238715 A1 | 10/2006 | Hirata et al. |
| 2006/0268207 A1 | 11/2006 | Tan et al. |
| 2007/0146644 A1 | 6/2007 | Mi et al. |
| 2007/0183035 A1 | 8/2007 | Asakawa et al. |
| 2007/0195676 A1 | 8/2007 | Hendriks et al. |
| 2007/0217008 A1 | 9/2007 | Wang et al. |
| 2007/0223349 A1 | 9/2007 | Shimada et al. |
| 2007/0242187 A1 | 10/2007 | Yamaki et al. |
| 2007/0242228 A1 | 10/2007 | Chen et al. |
| 2007/0242352 A1 | 10/2007 | MacMaster |
| 2009/0040607 A1 * | 2/2009 | Amako et al. ............ 359/486 |
| 2009/0109377 A1 * | 4/2009 | Sawaki et al. ............ 349/96 |

FOREIGN PATENT DOCUMENTS

| | | |
|---|---|---|
| CN | 1692291 | 11/2005 |
| CN | 03814105.1 | 11/2005 |
| DE | 3707984 A1 | 9/1988 |
| DE | 103 27 963 | 1/2005 |
| EP | 0317910 A1 | 5/1989 |
| EP | 0336334 B1 | 10/1989 |
| EP | 0349309 B1 | 1/1990 |
| EP | 0357946 B1 | 3/1990 |
| EP | 0407830 B1 | 1/1991 |
| EP | 0416157 A1 | 3/1991 |
| EP | 0488544 A1 | 6/1992 |
| EP | 0507445 A2 | 10/1992 |
| EP | 0518111 A1 | 12/1992 |
| EP | 0543061 A1 | 5/1993 |
| EP | 566 004 | 10/1993 |
| EP | 0588937 B1 | 3/1994 |
| EP | 0606940 A2 | 7/1994 |
| EP | 0349144 B1 | 9/1994 |
| EP | 0634674 A2 | 1/1995 |
| EP | 0670506 A1 | 9/1995 |
| EP | 0521591 B1 | 10/1995 |
| EP | 0731456 | 9/1996 |
| EP | 0744634 A2 | 11/1996 |
| JP | 56156815 | 12/1981 |
| JP | 02-308106 | 12/1990 |
| JP | 3005706 | 1/1991 |
| JP | 04 366916 | 6/1991 |
| JP | 4-12241 | 1/1992 |
| JP | 5134115 | 5/1993 |
| JP | 5288910 | 11/1993 |
| JP | 7005316 | 1/1995 |
| JP | 7-146469 | 6/1995 |
| JP | 9090122 | 4/1997 |
| JP | 9178943 | 7/1997 |
| JP | 09-507926 | 8/1997 |
| JP | 9288211 | 11/1997 |
| JP | 10-003078 | 1/1998 |
| JP | 10073722 A | 3/1998 |
| JP | 10084502 | 3/1998 |
| JP | 10-153706 | 6/1998 |
| JP | 10-260403 | 9/1998 |
| JP | 10-268301 | 10/1998 |
| JP | 1- 164819 | 3/1999 |
| JP | 11142650 | 5/1999 |
| JP | 11237507 | 8/1999 |
| JP | 11-258603 | 9/1999 |
| JP | 11-306581 | 11/1999 |
| JP | 2000-147487 | 5/2000 |
| JP | 2001074935 | 3/2001 |
| JP | 2004157159 | 6/2004 |
| JP | 2004309903 | 11/2004 |

| | | |
|---|---|---|
| JP | 2005195824 | 7/2005 |
| JP | 2005534981 | 11/2005 |
| JP | 2006047813 | 2/2006 |
| KR | 10-2003-0079268 | 10/2003 |
| KR | 10-2003-0090021 | 11/2003 |
| KR | 10-2004-0046137 | 6/2004 |
| WO | WO96/15474 | 5/1996 |
| WO | WO 97/01788 | 1/1997 |
| WO | WO0070386 | 11/2000 |
| WO | WO01/89677 | 4/2001 |
| WO | WO03/054619 | 7/2003 |
| WO | WO03/102652 | 12/2003 |
| WO | WO03/107046 | 12/2003 |
| WO | WO2004013684 | 2/2004 |
| WO | WO2004/019070 | 3/2004 |
| WO | WO2004/072692 | 8/2004 |
| WO | WO2005019503 | 3/2005 |
| WO | WO2005/065182 | 7/2005 |
| WO | WO2005079233 | 9/2005 |
| WO | WO2005/101112 | 10/2005 |
| WO | WO2005/123277 | 12/2005 |
| WO | WO2006/014408 | 2/2006 |
| WO | WO2006/036546 | 4/2006 |

OTHER PUBLICATIONS

Zhang et al., "A broad-angle polarization beam splitter based on a simple dielectric periodic structure." Optices Express, Oct. 29, 2007, 6 pages, vol. 15, No. 22.

Compact Disc Audio, http://hyperphusics.phy-astr.gsu.edu/hbase/audio/cdplay.html, Nov. 26, 2007.

Robinson et al., "Wide Field of View Compensation Scheme for Cube Polarizing Beam Splitters." SID 03 Digest, pp. 1-4, www.colorlink.com.

Baur, "A new type of beam splitting polarizer cube," Meadowlark Optics, 2005, pp. 1-9.

Pentico, Clark et al., "New, High Performance, Durable Polarizers for Projection Displays." SID 01 Digest, 2001, pp. 1287-1289.

Brummelaar et al., "Beam combining optical components," Chara Technical Report, Jan. 5, 1998, pp. TR61-1 to Tr 61-17, No. 61.

Bruzzone, et al.,"High-performance LCoS optical engine using cartesian polarizer technlogy," SID 03 Digest, 2003, pp. 1-4.

Fritsch, et al., "A liquid-crystal phase modulator for large-screen projection." IEEE, Sep. 1989, pp. 1882-1887, vol. 36, No. 9.

Deguzman et al., "Stacked subwavelength gratings as circular polarization filters." Applied Optices, Nov. 1, 2001, pp. 5731-5737, vol. 40, No. 31.

Tyan et al., "Polarizing beam splitter based on the anisotropic spectral reflectivity characteristic of form-birefringent multilayer gratings." Optics Letters, May 15, 1996, pp. 761-763, vol. 21, No. 10.

Brown, Thomas Benjamin, Lloyd William Taylor, Manual of Advanced Undergraduate Experiments in Physics, p. 302 (1959).

Flanders, Application of ≈100 Å linewidth structures fabricated by shadowing techniques[a], J. Vac. Sci. Technol., 19(4), Nov./Dec. 1981, pp. 892-895.

Kuta et al. "Coupled-wave analysis of lamellar metal transmission gratings for the visible and the infrared," J. Opt. Soc. Am. A/vol. 12, No. 5/May 1995, pp. 1118-1127.

Lochbihler et al. "Diffraction from highly conducting wire gratings of arbitrary cross-section," Journal of Modern Optics, 1993, vol. 40, No. 7, pp. 1273-1298.

Novak et al., "Far infrared polarizing grids for use at cryogenic temperatures," Applied Optics, Aug. 15, 1989/vol. 28, No. 15, pp. 3425-3427.

Auton et al, "Grid Polarizers for Use in the Near Infrared," Infrared Physics, 1972, vol. 12, pp. 95-100.

Handbook of Optics, 1978, pp. 10-68, and 10-72 through 10-77, editor, Harold B. Crawford et al.

Handbook of Optics vol. II, $2^{nd}$ Edition, pp. 3.32-3.35, editor, Michael et al. 1995.

Glytsis et al, "High-spatial-frequency binary and multilevel stairstep gratings: polarization-selective mirrors and broadband antireflection surfaces," Applied Optics Aug. 1, 1992 vol. 31, No. 22 pp. 4459-4470.

Auton, "Infrared Transmission Polarizers by Photolithography,"Applied Optics, Jun. 1967 vol. 6, No. 6, pp. 1023-1027.

Haggans et al., "Lamellar gratings as polarization components for specularly reflected beams," Journal of Modern Optics, 1993, vol. 40, No. 4, pp. 675-686.

Nordin et al., "Micropolarizer array for infrared imaging polarimetry", J. Op. Soc. Am. vol. 16 No. 5/May 1999, pp. 1168-1174.

Bird et al., "The Wire Grid as a Near-Infrared Polarizer," J. Op. Soc. Am. vol. 50 No. 9 (1960), 886-891.

Finchamet et al., "Linear Polarization by anisotrophy-crystals and grids." Optics $9^{th}$ Edition, pp. 338-339 (1980).

Whitbourn et al, "Phase shifts in transmission line models of thin periodic metal grids," Applied Optics Aug. 15, 1989 vol. 28, No. 15, pp. 3511-3515.

Enger et al, "Optical elements with ultrahigh spatial-frequency surface corrugations," Applied Optics Oct. 15, 1983, vol. 22, No. 20 pp. 3220-3228.

Knop, "Reflection Grating Polarizer for the Infrared," Optics Communications vol. 26, No. 3, Sep. 1978, pp. 281-283.

Hass et al, "Sheet Infrared Transmission Polarizers," Applied Optics Aug. 1965, vol. 4, No. 8 pp. 1027-1031.

Flanders, "Submicrometer periodicity gratings as artificial anisotropic dielectrics," Appl. Phys. Lett. 42 (6), Mar. 15, 1983, pp. 492-494.

Li Li et al , "Visible broadband, wide-angle, thin-film multilayer polarizing beam splitter," Applied Optics May 1, 1996, vol. 35, No. 13, pp. 2220-2225.

Sonek et al., "Ultraviolet grating polarizers," J. Vac. Sci. Technol., 19(4), Nov./Dec. 1981, pp. 921-923.

N. M. Ceglio, Invited Review "Revolution in X-Ray Optics", J. X-Ray Science & Tech. 1, pp. 7-78 (1989).

Dainty, et al, "Measurements of light scattering by characterized random rough surface", Waves in Random Media 3 (1991), pp. 529-531, 534-539.

DeSanto et al, "Rough surface scattering", Waves in Random Media 1 (1991).

Zanzucchi et al., "Corrosion Inhibitors for Aluminum Films" Journal of Electrochem Soc., vol. 135. No. 6, Jun. 1988, pp. 1370-1375, David Sarnoff Research Center, Princeton, NJ 08543-5300.

Moshier et al. "The Corrosion and Passively of Aluminum Exposed to Dilute Sodium Sulfate Solutions." Corrosion Science vol. 27. No. 8 pp. 785-801 1987.

Scandurra, et al. "Corrosion Inhibition of Al Metal in Microelectronic Devices Assemble in Plastic Packages." Journal of the Electrochemical Society, 148 (8) B289-B292 (2001).

Takano, Kuniyoshi et al. "Cube polarizers by the use of metal particles in anodic alumina films." Applied Optics, vol. 33, No. 16, 3507-3512, Jun. 1, 1994.

Lopez, et al. "Wave-plate polarizing beam splitter based on a form-birefringent multilayer grating." Optics Letters, vol. 23, No. 20, pp. 1627-1629, Oct. 15, 1998.

Chen, J. et al. "Optimum film compensation modes for TN and VA LCDs" SID 98 Digest, pp. 315-318, 1998.

Richter, Ivan et al. "Design considerations of form birefringent microstructures." Applied Optics, vol. 34, No. 14, pp. 2421-2429, May 10, 1995.

Tyan, Rong-Chung et al. "Design, fabrication, and characterization of form-birefringent multilayer polarizing beam splitter." Optical Society of America, vol. 14, No. 7, pp. 1627-1636, Jul. 1997.

Ho, G H et al. "The mechanical-optical properties of wire-grid type polarizer in projection display system." SID 02 Digest, pp. 648-651, 2002.

Kostal, Hubert, NanoTechnology "using advanced lithography to pattern nano-optic devices" www.solid-state.com, Sep. 2005, p. 26 and 29.

Kostal, Hubert "Nano-optics: robust, optical devices for demanding applications" Military & Aerospace Electronics, Jul. 2005, 6 pages.

Kostal, Hubert "Nano-optic devices enable integrated fabrication" www.laserfocuswold.com, Jun. 2004 pp. 155, 157-159.

Wang, Jian et al. "Free-Space nano-optical devices and integration: design, fabrication, and manufacturing" Bell Labs Technical Journal, 2005 pp. 107-127, vol. 10, No. 3.

Wang et al. "Diffractive optics: nanoimprint lithography enables fabrication of subwavelength optics" LaserFocusWorld, http://lfw.pennnet.com/Articles/Article_Dispaly.cf . . . Apr. 19, 2006, 6 pages.

Wang et al. "High-performance nanowire-grid polarizers" Optical Society of America 2005, pp. 195-197, vol. 30, No. 2.

Wang et al. "Fabrication of a new broadband waveguide polarizer with a double-layer 190 nm period metal-gratings using nanoimprint lithography" Journal Vac. Sci. Technology B, Nov./Dec. 1999, pp. 2957-2960, vol. 17, No. 6.

Savas et al. "Achromatic interferometric lithography for 100-nm-period gratings and grids" Journal Vac. Sci. Technology B, Nov./Dec. 1995, pp. 2732-2735, vol. 13, No. 6.

Haisma et al. "Mold-assisted nanolithography: a process for reliable pattern replication" Journal Vac. Sci. Technology B, Nov./Dec. 1996, pp. 4124-4128, vol. 14, No. 6.

Wang et al. "High-performance large-area ultra-broadband (UV to IR) nanowire-grid polarizers and polarizing beam-splitters" Proc. of SPIE 2005, pp. 1-12, vol. 5931.

Wang et al. "Monolithically integrated isolators based on nanowire-grid polarizers" IEEE, Photonics Technology Letters, Feb. 2005, pp. 396-398, vol. 17, No. 2.

Deng et al. "Multiscale structures for polarization control by using imprint and UV lithography" Proc. of SPIE, 2005, pp. 1-12. vol. 6003.

Kostal et al. "MEMS Meets Nano-optics The marriage of MEMES platform for tunable optical filters" www.fiberoptictechnology.net, Fiber Optic Technology, Nov. 2005, pp. 8-13.

Kostal et al. "Adding parts for a greater whole" SPIE's oeMagazine, May 2003, pp. 24-26.

Deng et al. "Wideband antireflective polarizers based on integrated diffractive multilayer microstructures" Optics Letters, Feb. 1, 2006, pp. 344-346, vol. 31., No. 3.

Chen, et al. "Novel polymer patterns formed by lithographically induced self-assembly (LISA)", American Chemical Society, Jan. 2005, pp. 818-821, vol. 21, No. 3.

Perkins, U.S. Appl. No. 11/669,765, filed Jan. 31, 2007.

Baur, "A new type of beam splitting polarizer cube," Meadowlark Optics, 2005, pp. 1-9.

* cited by examiner

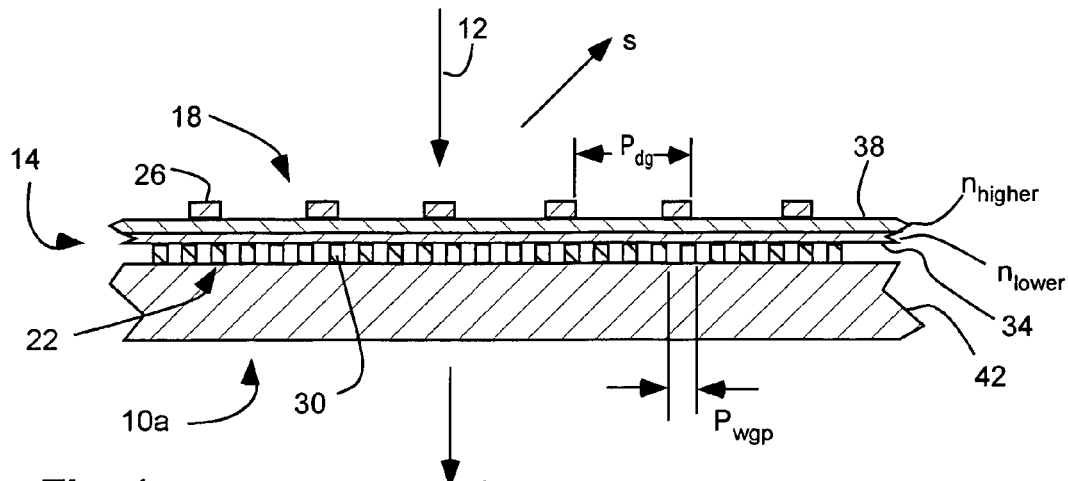
Fig. 1a
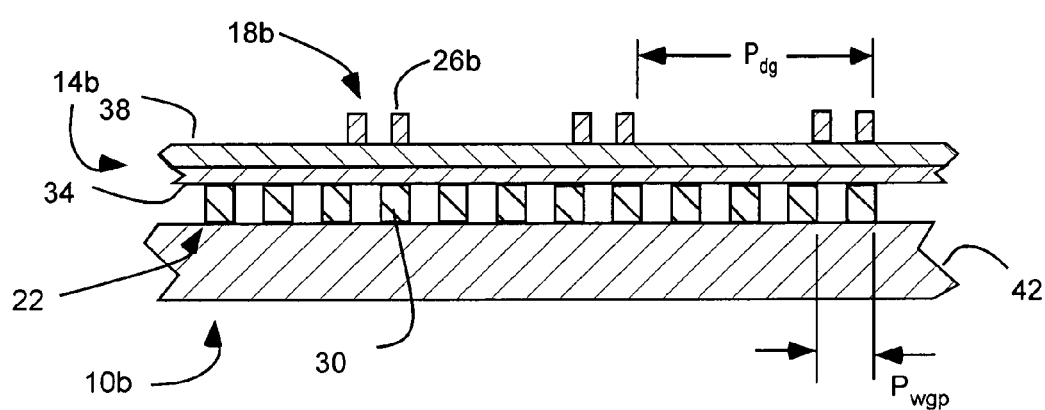
Fig. 1b
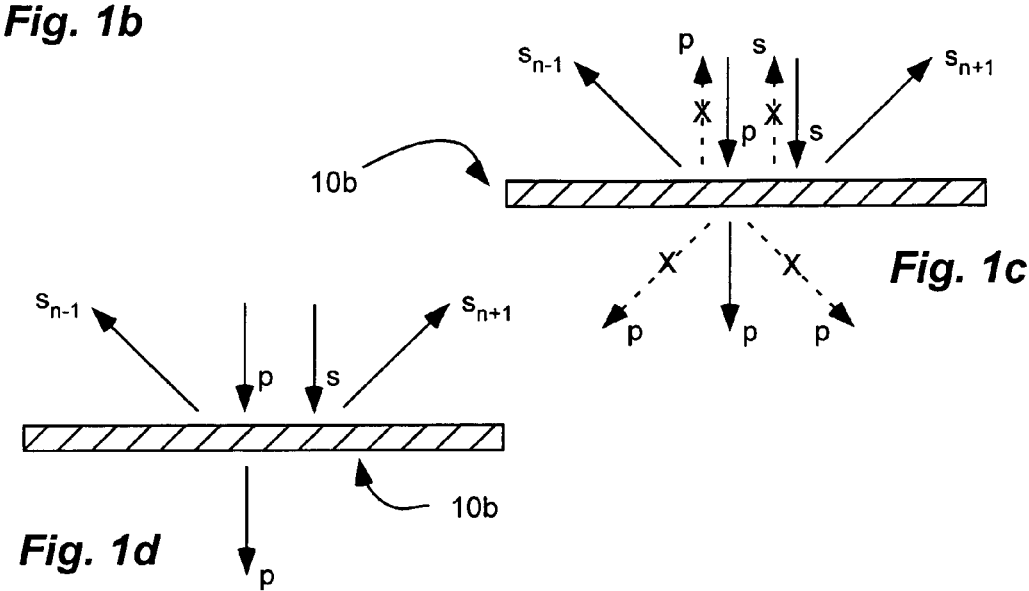
Fig. 1c
Fig. 1d

S Polarization Reflectance

POLARIZATION DEVICE TO POLARIZE AND FURTHER CONTROL LIGHT

RELATED APPLICATIONS & PRIORITY CLAIM

This is a continuation-in-part of U.S. patent application Ser. No. 11/005,927 filed Dec. 6, 2004, now U.S. Pat. No. 7,570,424, which is herein incorporated by reference.

This is related to U.S. patent application Ser. Nos. 11/469,210; 11/469,226; 11/469,241; 11/469,253 and 11/469,266, filed Aug. 31, 2006; which are herein incorporated by reference.

This is related to U.S. patent application Ser. Nos. 11/475,857 and 11/478,459, filed Jun. 26, 2006; which are herein incorporated by reference.

BACKGROUND

1. Field of the Invention

The present invention relates generally to a combined polarizer and diffraction grating to polarize and further control light, such as by reducing zero order back reflection.

2. Related Art

Diffraction gratings are a periodic structure of dielectric material with a period (p) greater than about half the wavelength ($\lambda$) of incident light, or $p \gtrsim \sim\lambda/2$. The diffraction grating scatters the normally incident light at discrete angles or directions in accordance with $m\lambda = p \sin \theta$, where m is the order and $\theta$ is the angle with respect to normal from the diffraction grating. Thus, different wavelengths are reflected or scattered at different angles.

Wire grid polarizers are a periodic structure of conductive elements with a length greater than the wavelength and a period less than about half the wavelength of the incident light, or $p \lesssim \sim\lambda/2$. Examples of wire grid polarizers are shown in U.S. Pat. Nos. 6,288,840; 6,243,199 and 6,122,103. Wire grid polarizers have been proven to be effective for visible light (~400-700 nm, or ~0.4-0.7 microns or µm) and their use demonstrated as polarizers and beam splitters in optical imaging systems. For example, see U.S. Pat. Nos. 6,234,634 and 6,447,120. Composite wire-grid polarizers have been proposed in which the wires include alternating layers of dielectric and conductive layers. For example, see U.S. Pat. Nos. 6,532,111; 6,665,119; 6,788,461 and 7,113,335. Such polarizers, however, can also back reflect a portion of the incident light resulting in a ghost image, indicated at 500 in FIG. 13. One solution has been to tilt or angle the polarizer to direct the back reflection out of or away from the optical path, as shown in FIG. 14. Tilting the polarizer, however, can take-up valuable space in a compact design, and can cause unwanted astigmatism.

SUMMARY OF THE INVENTION

It has been recognized that it would be advantageous to develop a wire grid polarizer or polarizer device capable of reducing back reflection, and thus capable of reducing ghost images when used in an imaging system or display system. In addition, it has been recognized that it would be advantageous to develop a wire grid polarizer or polarizer device capable of polarizing and further controlling the light, such as the direction or modes of reflection. In addition, it has been recognized that it would be advantageous to develop a non-zero order type polarizer device capable of polarizing light while reflecting only light of non-zero order, and without reflecting light of the zero order. Furthermore, it has been recognized that it would be advantageous to develop an imaging system with such a wire grid polarizer or polarizer device capable of conserving space in the optical design, and capable of reducing ghost images and unwanted astigmatism.

The invention provides a polarization device configured to polarize and further control light incident on the device. The device includes an optical stack with a diffraction grating and a wire grid polarizer with one disposed over the other and configured to be disposed in the light. The wire grid polarizer includes an array of elongated, parallel conductive wires in accordance with $P_{WGP} < \lambda/2$ where $P_{WGP}$ is the period of the wires and $\lambda$ is the wavelength of the light, to polarize the light by substantially reflecting light having an s-polarization orientation and substantially transmitting light having a p-polarization orientation. The diffraction grating includes an array of elongated parallel dielectric ribs in accordance with $P_{DG} > \lambda/2$ where $P_{DG}$ is the period of the ribs, to substantially diffract light with the s-polarization orientation of non-zero order at a non-orthogonal angle, so that the diffraction grating and the wire grid polarizer together pass light having p-polarization orientation while diffracting light having s-polarization orientation.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1a is a cross-sectional side view of a polarizer device in accordance with an embodiment of the present invention;

FIG. 1b is a detailed cross-sectional side view of another polarizer device in accordance with another embodiment of the present invention;

FIGS. 1c and 1d are schematic side views of the polarizer device of FIG. 1a showing its operation;

Figure 1E:
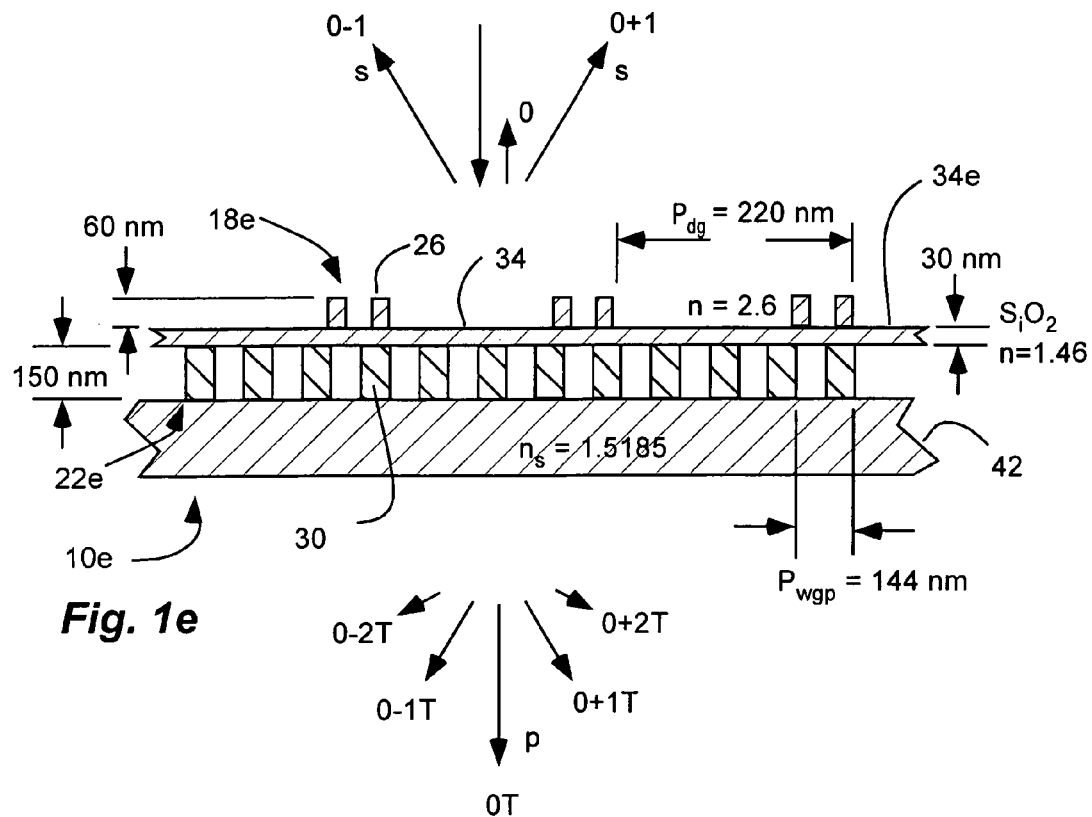
FIG. 1e is a cross-sectional side view of an exemplary polarizer device in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term dielectric is used herein to mean non-metallic.

The terms polarizer and polarizing beam splitter are used interchangeably herein. Specifically, the terms wire-grid polarizer (WGP) and wire-grid polarizing beam splitter (WGP PBS) are used interchangeably herein.

The term continuous is used here to denote continuous in at least two dimensions, such as continuous in a plane or continuous across a planar surface in both directions.

Description

Polarizer devices in exemplary implementations of the invention are shown which can be used to polarize and further control light, and which can be used with image or display systems. Such polarizer devices can polarize and further control light, such as by reducing zero order reflections, or back reflection. Such polarizer devices can be a combination of a wire grid polarizer and a diffraction grating, configured to reduce zero order back reflections of s-polarized light. It will be appreciated that other configurations are possible depending on the intended application. Image or display systems in exemplary implementations of the invention are shown using the polarizer devices. Such display systems can utilize such polarizer devices to reduce ghost images, conserve space in the optical design by being oriented orthogonal to the incident light, and thus reduce unwanted astigmatism. It will be appreciated that other applications are possible, including for example fiber optics.

Referring to FIG. 1*a*, a polarizer device 10*a* is shown disposed in a beam of incident light or an incident light beam 12. Such an incident light beam 12 can be an unpolarized light beam, a polarized light beam, a light beam with image information encoded thereon, an image beam, a color beam, etc. The polarizer device 10*a* includes an optical stack 14 with a plurality of layers. In one aspect, the device 10*a* or optical stack 14 is oriented normal or orthogonal ($\theta = \sim 0$) to the incident light beam 12, as shown. The optical stack includes a diffraction grating 18 and a wire grid polarizer 22 disposed one over the other. In one aspect, the diffraction grating 18 is stacked over the wire grid polarizer 22, with the visible light beam incident on the diffraction grating, or encountering the diffraction grating prior to encountering the wire grid polarizer. Thus, the incident light beam first encounters the diffraction grating, and subsequently encounters the wire grid polarizer. In addition, the diffraction grating 18 can "face" the incident light beam, or be oriented so that the incident light beam strikes the ribs of the diffraction grating. It is of course understood that the diffraction grating may be covered with further layers, or that the optical stack can include additional layers over the diffraction grating, such as anti-reflective coatings, etc. The diffraction grating 18 and wire grid polarizer 22 can be combined together, or affixed together, in a single unit or optical stack to conserve space in an optical design, and for ease of handling or installing, as shown in FIG. 1*a* or 1*b*. Alternatively, a device 10*f* can include the diffraction grating 18 and the wire grid polarizer 22 spaced-apart from one another to facilitate fabrication, as shown in FIG. 1*f*.

The diffraction grating 18 can include an array of elongated parallel dielectric ribs 26 with a period in accordance with $P_{DG} > \lambda/2$, where $P_{DG}$ is the period of the ribs (and $\lambda$ is the wavelength of the visible light beam). In one aspect, the period $P_{DG}$ can be greater than 0.21 microns and less than 1 micron or micrometer. (As described below, the period of the diffraction grating can be approximately five times greater than the period of the wire grid polarizer.) Thus, the diffraction grating diffracts reflected or transmitted light, and specifically substantially diffracts light with the s-polarization orientation of non-zero order at a non-orthogonal angle ($\theta \neq 0$) or angle greater than zero ($\theta > 0$). Furthermore, each rib 26 can be split into at least a pair of ribs, as shown in FIG. 1*b*. It is believed that splitting the ribs 26 facilitates suppression of zero order reflected light and non-zero order transmitted light. Thus, the diffraction grating 18 includes a periodic array of rib pairs.

The wire grid polarizer 22 includes an array of elongated, parallel conductive wires 30 with a period in accordance with $P_{WGP} < \lambda/2$ where $P_{WGP}$ is the period of the wires (and $\lambda$ is the wavelength of the visible light beam). In one aspect, the period can be less than about 0.21 microns to polarize the incident light. The wire grid polarizer 22 substantially reflects the incident light with s-polarization orientation, and substantially transmits the incident light with p-polarization orientation. Thus, the wire grid polarizer 22 acts like a plane mirror to s-polarized light. Various aspects of wire grid polarizers are described in U.S. Pat. Nos. 6,208,463; 6,288,840; 6,243,199; 6,122,10; 6,785,050; 6,532,111; 6,714,350; 6,844,971; 6,665,119; and 6,788,461; which are herein incorporated by reference.

The array of conductive wires 30 of the wire grid 22 and the array of dielectric ribs 26 of the diffraction grating 18 can be substantially parallel with one another, as shown. In other words, the wires 30 can be parallel with the ribs 26. As stated above, the period $P_{DG}$ of the diffraction grating 18 can be greater than the period $P_{WGP}$ of the wire grid polarizer 22. It is believed that a diffraction grating period $P_{DG}$ approximately five times greater ($P_{DG} \approx 5\ P_{WGP}$) than the wire grid polarizer period $P_{WGP}$ will provide adequate diffraction of the light with s-polarization orientation or adequate reduction of light with the s-polarization orientation of zero-order. The arrays of both the wires and the ribs can be aligned so that the period of one begins at the period of another, as shown. Alternatively, the arrays can be staggered so that the starting period of one does not correspond to the other.

The optical stack 14 can also include one or more continuous layers disposed between the wire grid polarizer and the diffraction grating. The layers can include at least two layers having different refractive indices. A lower layer 34 can be disposed over the wire grid polarizer 22, and an upper layer 38 can be disposed over the lower layer. The upper layer 34 can have a refractive index $n_{upper}$ greater than a refractive index $n_{lower}$ of the lower layer 38 ($n_{upper}>n_{lower}$). The lower layer or a single layer can have a refractive index less than a refractive index $n_s$ of a substrate.

The wire grid polarizer 22 can include, or the wires 30 and optical stack 14 can be supported by, a substrate 42. The wires 30 can be formed or deposited on the substrate, such as by using a lithography process. The other layers can be formed or deposited over the wires. Similarly, the ribs 26 can be formed using a lithography process.

Referring to FIG. 1b, a polarizer device 10b or optical stack 14b is shown that is similar to that described above and the above description is incorporated herein. The ribs 26b of the diffraction grating 18b and the wires 30 of the wire grid polarizer 22 can form periodic structures or discontinuous layers with spaces between the ribs or wires. The spaces between the ribs or wires can contain a material different than the material of the ribs or wires. For example, the spaces between the wires 30 can be filed with a dielectric material.

Referring to FIGS. 1c and 1d, the operation of the device 10b or optical stack 14b is shown. Specifically, FIG. 1c shows the polarization and diffraction of s and p polarized light, including which orders are suppressed. Namely, the polarizer device 10b with split ribs (FIG. 1b) eliminates or reduces back reflection of both s-polarization orientation and p-polarization orientation (shown crossed out in dashed lines), and specifically eliminates or reduces back reflection of light having s-polarization orientation of zero order and diffracting light having s-polarization orientation of non-zero order. Thus, the rejected s-polarization orientation is not back reflected. FIG. 1d shows the resulting light beams and their polarization orientation (s or p). It can be seen that the diffraction grating 18 and the wire grid polarizer 22 together (or the device 10a or optical stack 14) pass light having p-polarization orientation while diffracting light having s-polarization orientation. More specifically, light with p-polarization orientation is substantially passed, light with s-polarization orientation is substantially reflected, but light with s-polarization orientation having a non-zero order is also diffracted, or reflected at a non-orthogonal or a non-zero angle ($\theta \neq 0$) or an angle greater than zero ($\theta > 0$). Thus, the resulting light is substantially transmitted p-polarized light and diffracted s-polarized light so that s-polarized light is not back reflected, as shown in FIG. 1d. It is believed that the polarizer device 10a without split ribs (FIG. 1a) can suppress back reflection of light of s-polarization orientation, but has difficulty suppressing non-zero transmitted light of p-polarization orientation.

Example 1

Figure 1F:
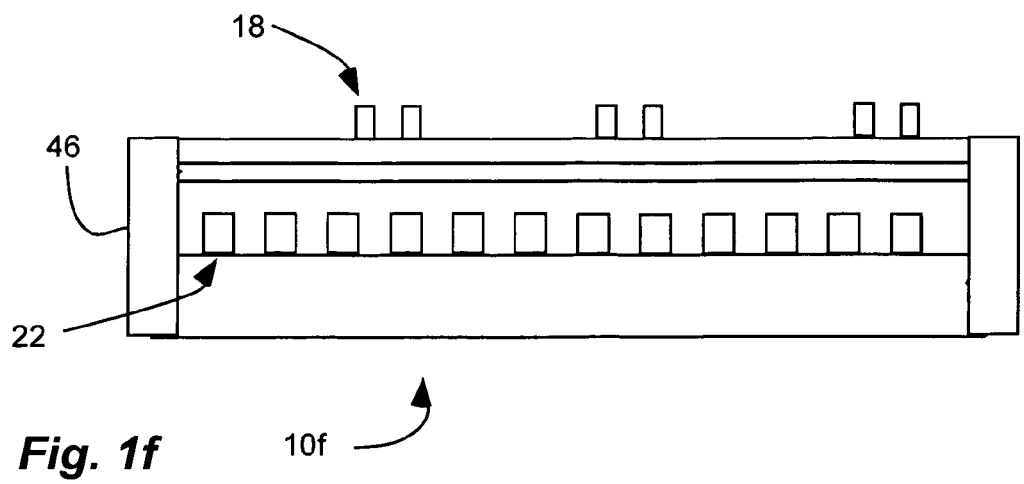
FIG. 1f is a cross-sectional side view of another polarizer device in accordance with another embodiment of the present invention.

Referring to FIG. 1e, a first non-limiting example of a polarizer device 10e is shown. The polarizer device 10e includes a substrate 42 of BK7 glass (ns=1.5185). A wire grid polarizer 22e is disposed on the substrate. The wire grid polarizer 22e includes an array of elongated, parallel conductive wires 30 formed of aluminum, with a pitch or period Pwgp of 144 nm, a thickness of 150 nm, and a duty cycle (ratio of period to width) of 0.50 or width of 72 nm. A layer 34e of silicon dioxide (SiO2) (N=1.46) is disposed over the wire grid 22e. A diffraction grating 18e is disposed over the layer 34e. The diffraction grating 18e includes an array of elongated parallel dielectric ribs 26 with a period or pitch Pdg of 720 nm, a thickness of 60 nm, and an index of refraction of 2.6. The ribs of the diffraction grating are split, as shown. The present configuration is configured for non-zero order diffraction in reflection.

Table 1 shows the calculated performance of the polarization device 10e with respect to just a wire grid polarizer (without a diffraction grating).

TABLE 1

Example 1

| | | Diffraction Order | | |
|---|---|---|---|---|
| | | 0 | −1 | 1 |
| s Polarization | | | | |
| Reflectance | No grating | 86% | 0% | 0% |
| | With grating | 0.13% | 44.40% | 44.40% |
| p Polarization | | | | |
| Reflectance | No grating | 4.00% | 0% | 0% |
| | With grating | 0.90% | 0.30% | 0.30% |
| Transmittance | No grating | 82.30% | 0% | 0% |
| | With grating | 82.90% | 0.60% | 0.60% |

Referring to Table 1, it can be seen that reflectance of the zero order s polarization is suppressed by the polarization device 10e, namely suppressed from 86% to 0.13%. In addition, zero order p polarization transmission is significantly unaffected.

Figure 2A:
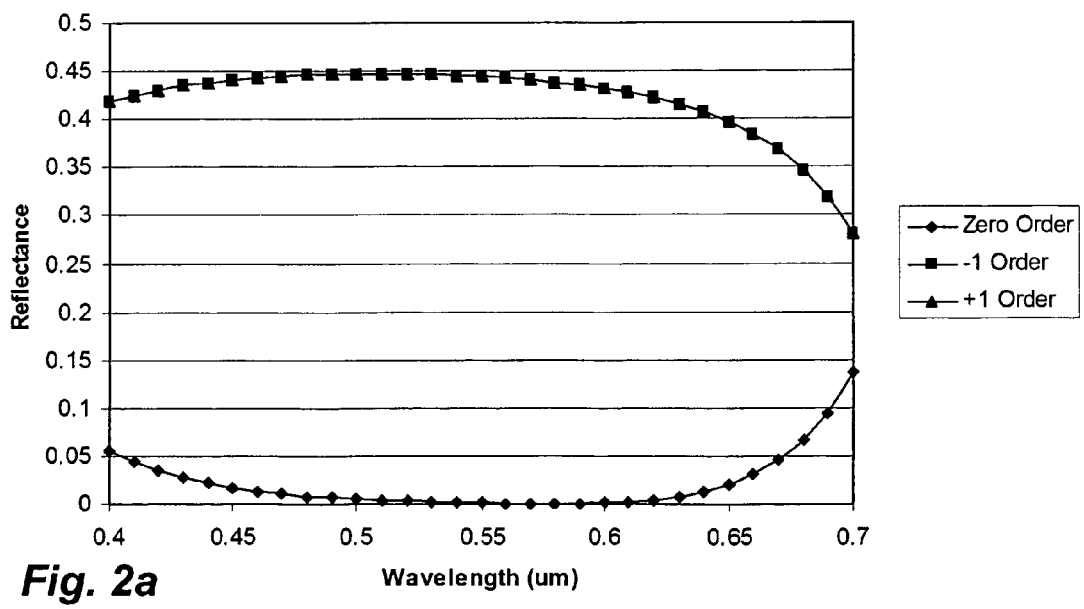
FIG. 2a is a graph of s polarization reflectance with respect to wavelength for the polarizer device of FIG. 1e.

Referring to FIG. 2a, it can be seen that the zero order reflection of s polarized light has been substantially suppressed; and across most of the visible spectrum the zero order is effectively suppressed. In comparison, a normal wire grid polarizer has approximately 84-86% reflection of the zero order (See FIG. 2e).

Figure 2B:
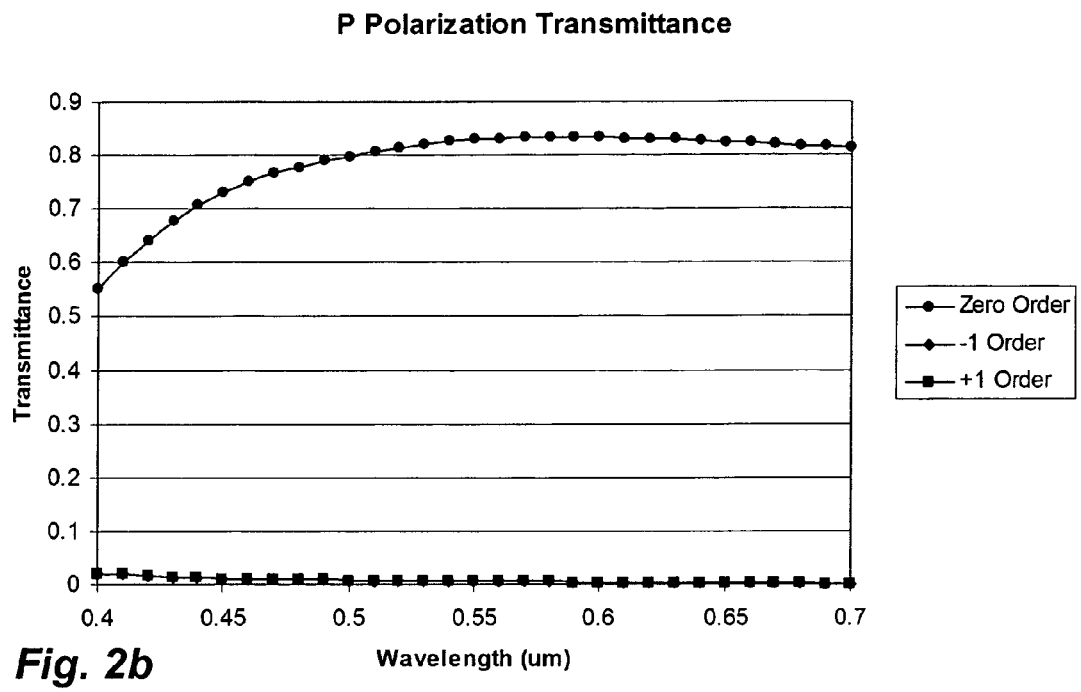
FIG. 2b is a graph of p polarization transmittance with respect to wavelength for the polarization device of FIG. 1e.

Referring to FIG. 2b, it can be seen that the zero order transmission of p polarized light has been substantially maintained.

Figure 2C:
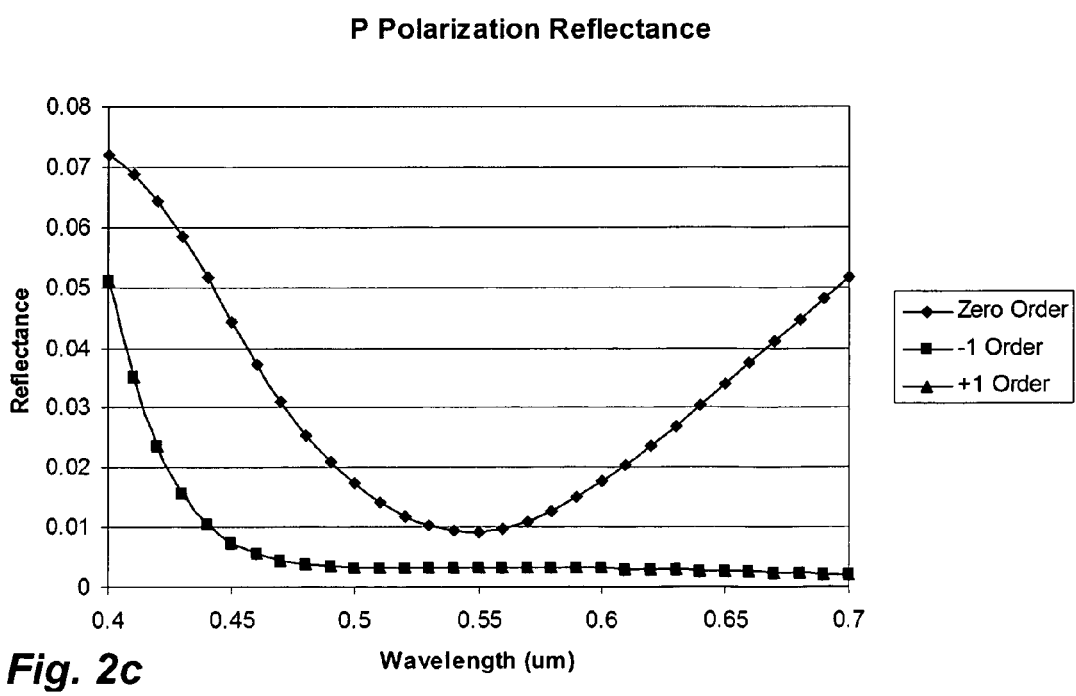
FIG. 2c is a graph of p polarization reflectance with respect to wavelength for the polarization device of FIG. 1e.

Referring to FIG. 2c, it can be seen that the p polarization reflectance is small.

Figure 2D:
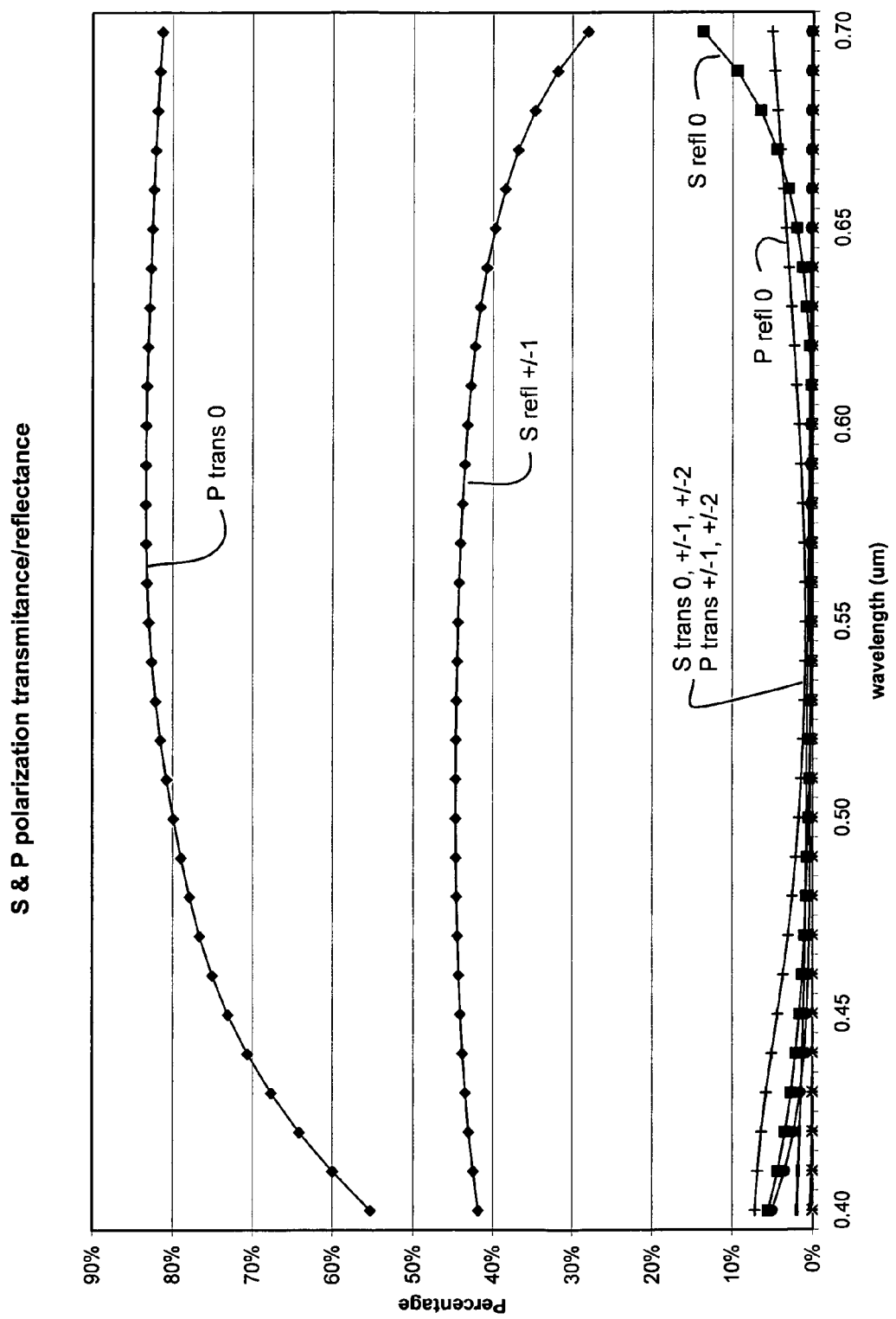
FIG. 2d is a graph of s and p polarization reflectance and transmittance for various orders with respect to wavelength for the polarization device of FIG. 1e.

Referring to FIG. 2d, it can again be seen that zero order transmission of p polarized light is high, while zero order refection of s polarized light is low.

Figure 2E:
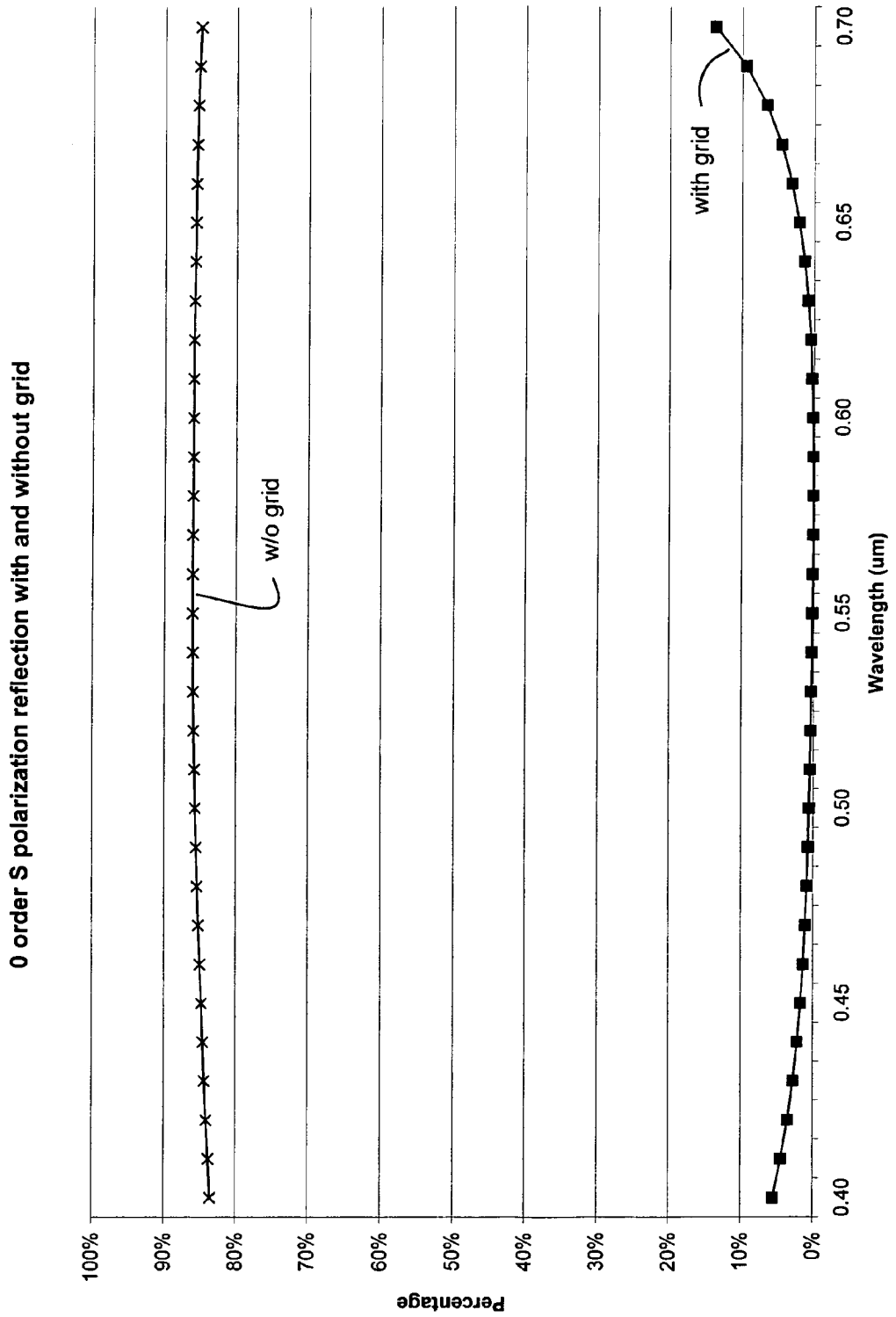
FIG. 2e is a graph of zero order s polarization reflectance with respect to wavelength for the polarization device of FIG. 1e, compared to just a wire grid polarizer.

Referring to FIG. 2e, s polarization reflectance of the zero order is compared with a wire grid polarizer. It can be seen that the present example significantly suppresses zero order s polarization reflectance.

Referring to FIG. 1f, the polarizer device 10f can include separate and spaced-apart wire grid polarizer 22 and diffraction grating 18. A support structure 46 can hold the wire grid polarizer and the diffraction grating together for ease of handling or assembly. The diffraction grating 18 may include another substrate to support the ribs.

Figure 3:
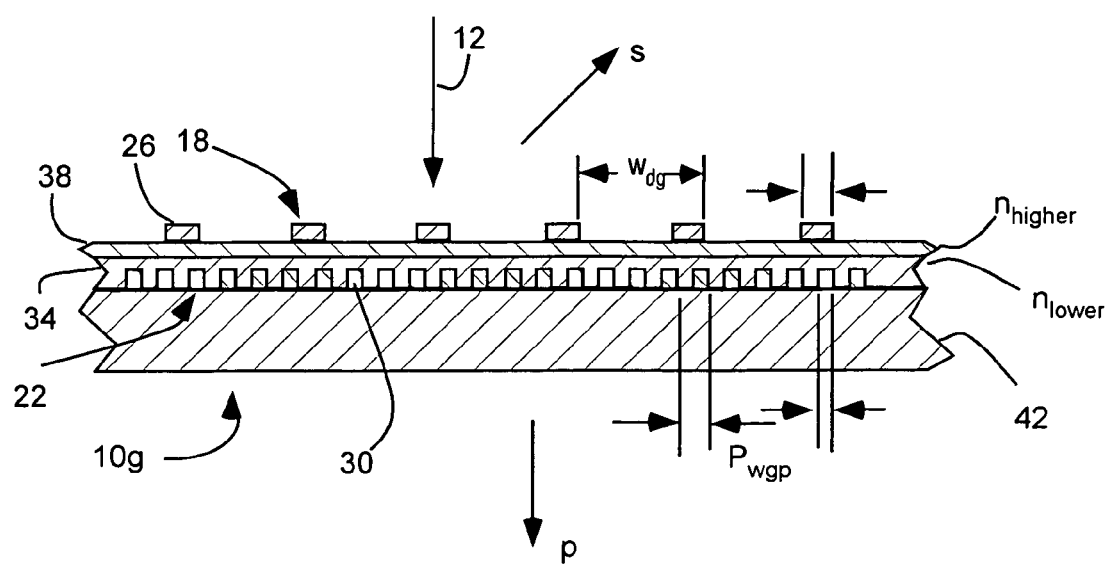
FIG. 3 is a cross-sectional side view of another polarizer device in accordance with another embodiment of the present invention.

Referring to FIG. 3, the polarizer device 10g can include a material, such as the lower layer 34, in the spaces between the wires 30. In addition, further layers may be disposed over the diffraction grating, including additional diffraction gratings. Furthermore, additional layers can be disposed between the diffraction grating and the wire grid polarizer, or between the substrate and the wires.

As stated above, such a polarizer device described above can be utilized in an image or projection display system.

Figure 4:
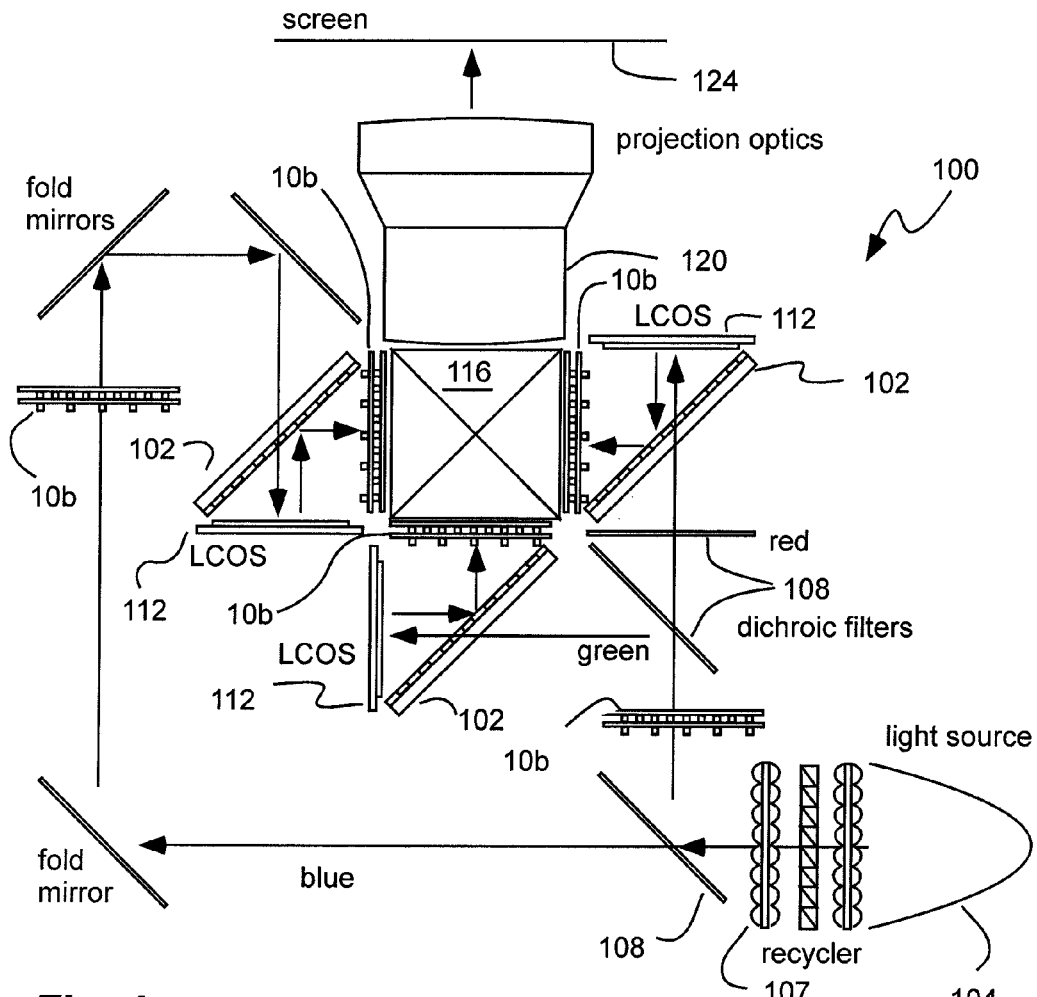
FIG. 4 is a schematic view of a projection display system in accordance with an embodiment of the present invention.

Referring to FIG. 4, a projection display system 100 utilizing a polarizer device (represented by 10b) is shown in accordance with the present invention. The polarizing device 10b can be any described above. The system 100 includes a light source 104 to produce a light beam. The light beam can be any appropriate type, as known in the art, including an arc light, an LED array, etc. The beam can be treated by various optics, including beam shaping optics, recycling optics 107, polarizing optics, etc. (Various aspects of using a wire-grid polarizer in light recycling are shown in U.S. Pat. Nos. 6,108,131 and 6,208,463; which are herein incorporated by reference.) One or more color separator(s) 108, such as dichroic filters, can be disposable in the light beam to separate the light beam into color light beams, such as red, green and blue. One or more polarizer devices 10b, with a wire-grid polarizer and dielectric grid, can be disposed in the color light beams to transmit p polarized light of the zero order, but without substantially reflecting s polarized light of the zero order. Thus, light is not back reflected into the system. In addition, the polarizer device 10b can be oriented substantially orthogonal to the light beam or optical path to save space. The polarizer device 10b can transmit a polarized color light beam. One or more beam splitters 102 can be disposed in the light beam to also polarize the light. Such beam splitters are described in U.S. Pat. Nos. 6,208,463; 6,243,199; 6,122,103; 6,228,840; 6,785,050; 6,532,111; 6,785,050; 6,714,350; 6,844,971; U.S. patent application Ser. No. 11/478,459, filed Jun. 26, 2006; and U.S. patent application Ser. Nos. 11/469,210; 11/469,226; 11/469,241; 11/469,253 and 11/469,266, filed Aug. 31, 2006; which are herein incorporated by reference. At least one reflective spatial light modulator 112, such as an LCOS panel, can be disposable in the polarized color light beam to encode image information thereon to produce an image bearing color light beam. The beam splitter 102 can be disposable in the image bearing color light beam to separate the image information and to reflect a polarized image bearing color light beam. As shown, three beam splitters 102 and three spatial light modulators 112 can be used, one for each color of light (blue, green, red). The polarized image bearing color light beams can be combined with an X-cube or recombination prism 116. Projection optics 120 can be disposable in the polarized image bearing color light beam to project the image on a screen 124. One or more polarizer devices 10b can be disposed in the image bearing color light beams.

A polarizer device (represented by 10b in FIG. 4) can be utilized as an analyzer, post polarizer, or clean-up polarizer, and disposed between the recombination prism and the LCOS/WGP-PBS pair, or immediately subsequent to the WGP-PBS in the optical path. Thus, the polarizer device 10b can further analyze or clean-up the image beam reflected from the WGP-PBS to further improve contrast, particularly for certain wavelength, such as the blue color channel. In addition, as described above, the polarizer device 10b also substantially diffracts light of the s-polarization orientation, and substantially reduces back reflection of light of the s-polarization of the zero-order, and thus reduces ghost images in the system. In addition, the polarizer device 10b can be oriented orthogonal to the incident light to maintain a compact design. Therefore, the polarizer device 10b can be configured or oriented in a projection system to be orthogonal or normal to the optical path, both efficiently utilizing space and reducing unwanted astigmatism, and reducing back reflection and ghost images.

In addition, a polarizer device (represented by 10b in FIG. 4) can be disposed in other locations where a polarizer can be used, such as in the light source, the beam shaping optics, after the beam shaping optics, and/or before the LCOS/WGP-PBS pair as a pre-polarizer. For example, the polarizer device 10b can be disposed prior to the WGP-PBS 102. Again, the polarizer device 10b can both polarize (or further polarize) the incident light and reduce back reflection in the optical path.

Figure 5:
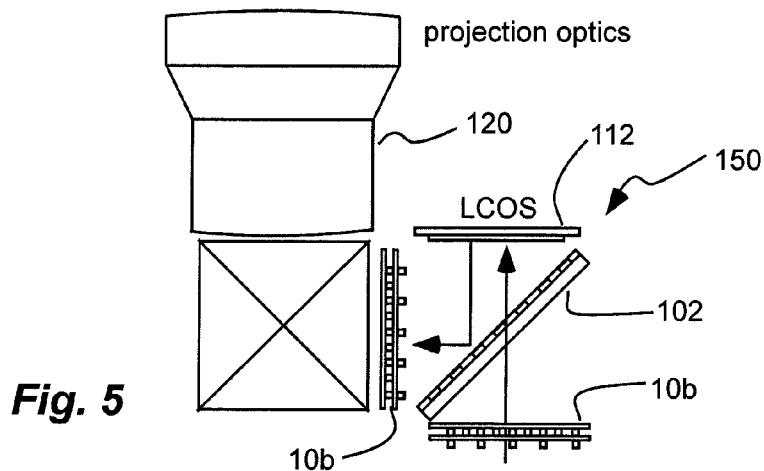
FIG. 5 is a schematic view of a modulation optical system in accordance with an embodiment of the present invention.
Figure 6:
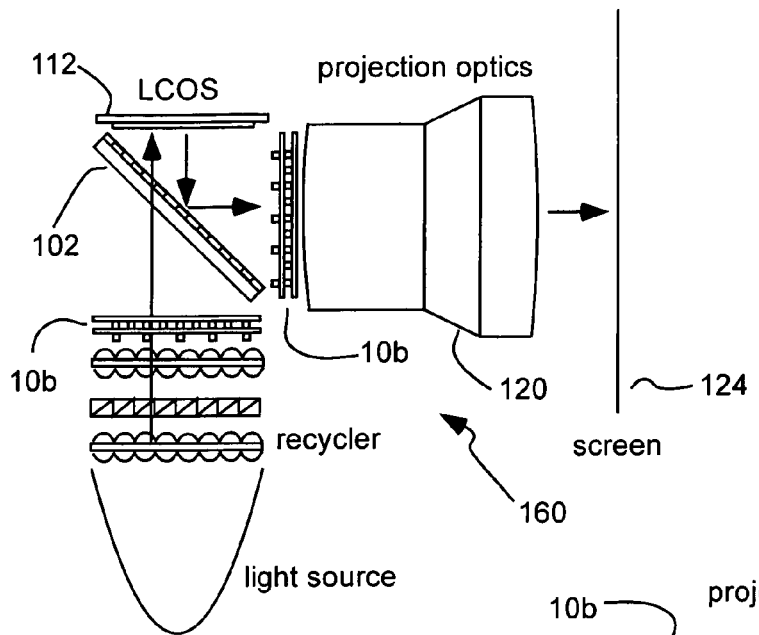
FIG. 6 is a schematic view of a projection display system in accordance with an embodiment of the present invention.

Referring to FIG. 5, it will be appreciated that the polarizer device (represented by 10b) described above can be used in a subsystem of the projection display, such as a light engine or a modulation optical system 150, which includes the spatial light modulator 112 and beam splitter 102. Such a modulation optical system may also include a light source, color separators, beam shaping optics, light recycler, pre-polarizers, post-polarizers, and/or an x-cube. One or more modulation optical systems can be combined with other optics and components in a projection system.

As described above, the reflective spatial light modulator 112 can be configured to selectively encode image information on a polarized incident light beam to encode image information on a reflected beam. The beam splitter 102 can be disposed adjacent the reflective spatial light modulator to provide the polarized incident light beam to the reflective spatial light modulator, and to separate the image information from the reflected beam. The polarizer device 10b can be disposed before and/or after the beam splitter 102.

Figure 7:
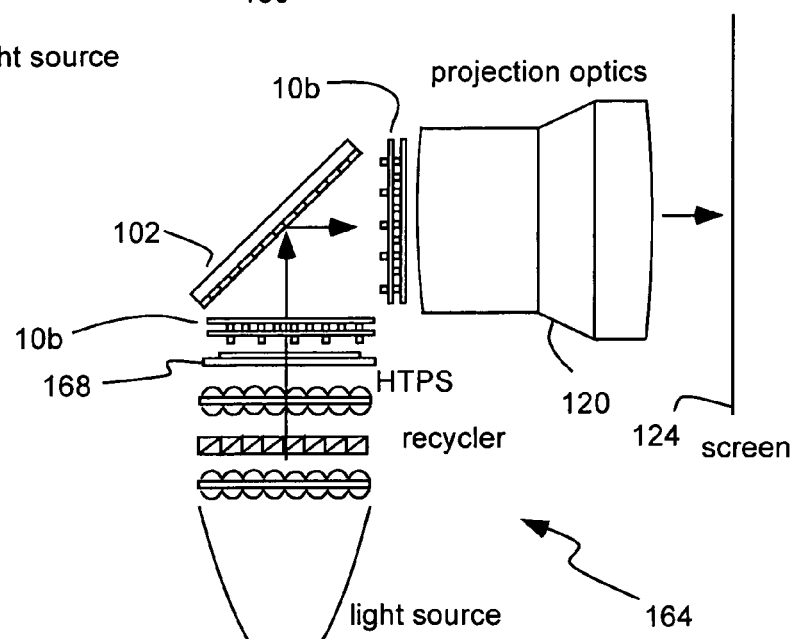
FIG. 7 is a schematic view of a projection display system in accordance with an embodiment of the present invention.
Figure 8:
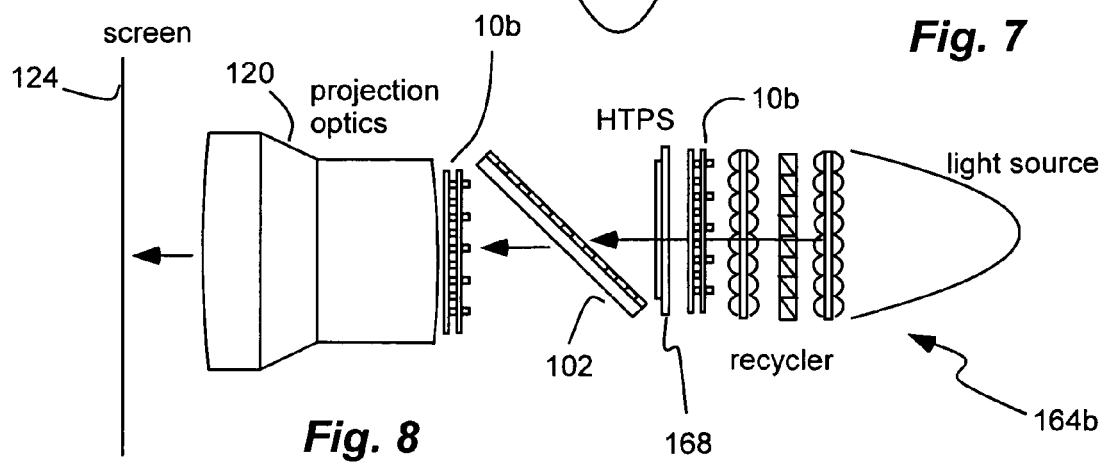
FIG. 8 is a schematic view of a projection display system in accordance with an embodiment of the present invention.

Although a three channel, or three color, projection system has been described above, it will be appreciated that a display system 150, 150b, 160, 164 or 164b can have a single channel, as shown in FIGS. 5-8 and 10. Alternatively, the single channels in FIGS. 5-8 and 10 can be modulated so that multiple colors are combined in a single channel. In addition, although the grid polarizer has been described above as being used with a reflective spatial light modulator, such as an LCOS panel (in FIGS. 4-6, 9 and 10), it will be appreciated that the grid polarizer can be used with a transmissive spatial light modulator 168, as shown in FIGS. 7 and 8. The transmissive spatial light modulator can be a high-temperature polysilicon (HTPS) panel.

Figure 9:
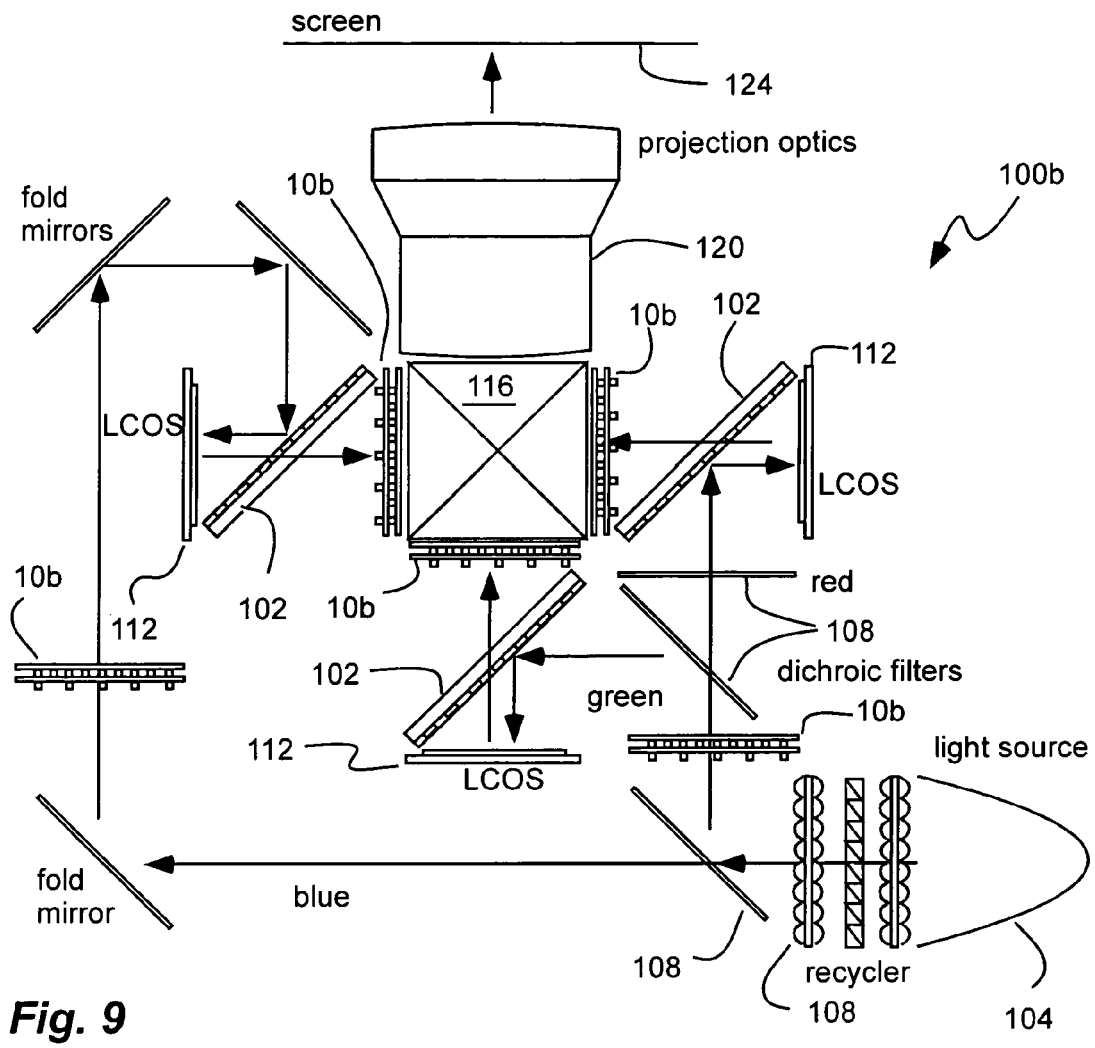
FIG. 9 is a schematic view of another projection display system in accordance with an embodiment of the present invention.
Figure 10:
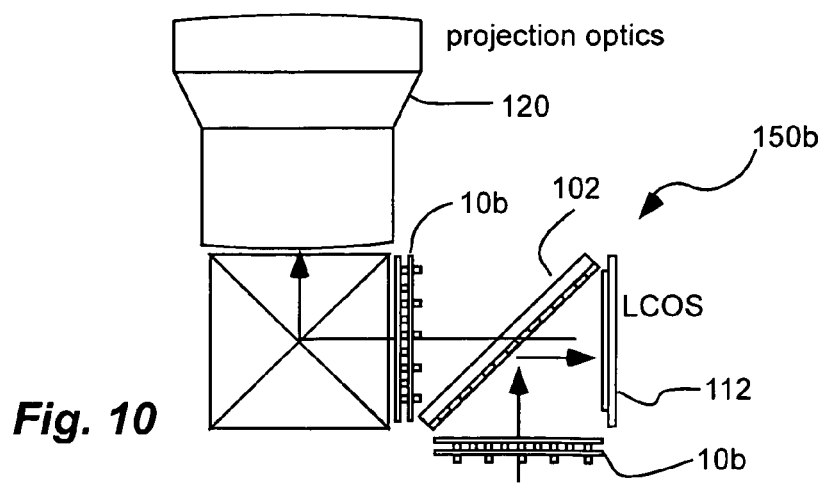
FIG. 10 is a schematic view of another modulation optical system in accordance with an embodiment of the present invention.

Although a projection system and modulation optical system were shown in FIGS. 5-8 with the beam splitter in reflection mode (or with the image reflecting from the beam splitter), it will be appreciated that a projection system 100b or modulation optical system 150b or 164b can be configured with the beam splitter in transmission mode (or with the image transmitting through the beam splitter), as shown in FIGS. 9-11.

Referring to FIG. 9B, a projection system 164b is shown with a transmissive spatial light modulator 168 and a beam splitter 102 used in transmission mode (or with the image transmitted through the beam splitter). It is believed that such a configuration can take advantage of the improved transmission contrast of the beam splitter 102.

Various display systems are shown in U.S. Pat. Nos. 6,234,634; 6,447,120; 6,666,556; 6,585,378; 6,909,473; 6,900,866; 6,982,733; 6,954,245; 6,897,926; 6,805,445; 6,769,779 and U.S. patent application Ser. Nos. 10/812,790; 11/048,675; 11/198,916; 10/902,319, which are herein incorporated by reference.

Although the polarizer device has been described above with respect to visible light applications, and more specifically with respect to projection display devices, the polarizer device can be configured for operation with other wavelengths, such as infrared light (>~700 nm), and other applications, such as telecommunications, including combiners and/or separators. Thus, a polarizer device 204 or 254 for use with infrared light can have a similar structure, but different periods or pitches, than those described above. For example, the wires of the wire grid polarizer can have a pitch or period less than the wavelength being treated. For infrared applications ($\lambda \approx 1300\text{-}1500$ nm), such as telecommunication systems, the wires can have a pitch or period less than 1 micron (1 μm or 1000 nm) in one aspect, or less than 0.4 microns (0.40 μm or 400 nm) in another aspect. The ribs of the dielectric grid can have a period or pitch approximately five times greater, or approximately 5 microns (5 µm or 5000 nm) in one aspect, or 2 microns (2.0 µm or 2000 nm) in another aspect.

Figure 11A:
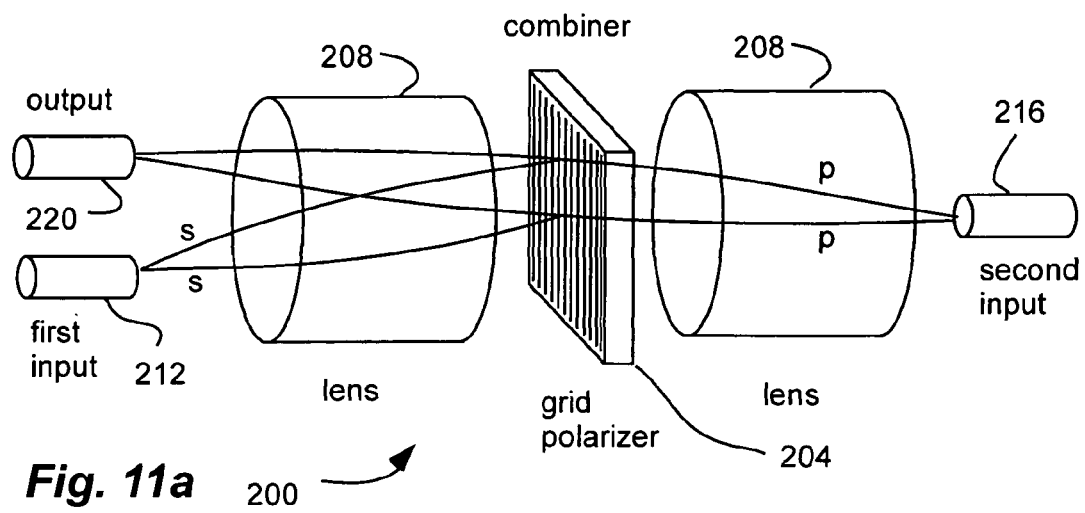
FIG. 11*a* is a schematic view of a combiner with a polarizer device in accordance with an embodiment of the present invention.

Referring to FIG. 11a, a combiner 200 is shown with a polarizer device 204 described above. The combiner 200 includes a polarizer device 204 as described above disposed between collimating/focusing lenses 208, such as graded index lenses, that can be oriented in a coaxial configuration so that their optical axes align to define an optical axis. First and second optical input fibers 212 and 216 are disposed on opposite sides of the combiner and oriented parallel to the optical axis. An optical output fiber 220 is disposed adjacent to the first input fiber 212 at an end of the lens and oriented parallel to the optical axis. The fibers can be polarizing maintaining fibers. The first input fiber 212 can contain a polarized beam of s-polarization orientation while the second input fiber 216 can contain a polarized beam of p-polarization orientation. The polarizer device 10b combines the beams into an output beam in the output fiber 220. The polarizer device 10b reflects the beam of the s-polarization orientation of non-zero order and into the output fiber, and passes the beam of p-polarization orientation. The reflected beam and the transmitted beam combine to form a composite depolarized output beam having both polarization states.

Figure 11B:
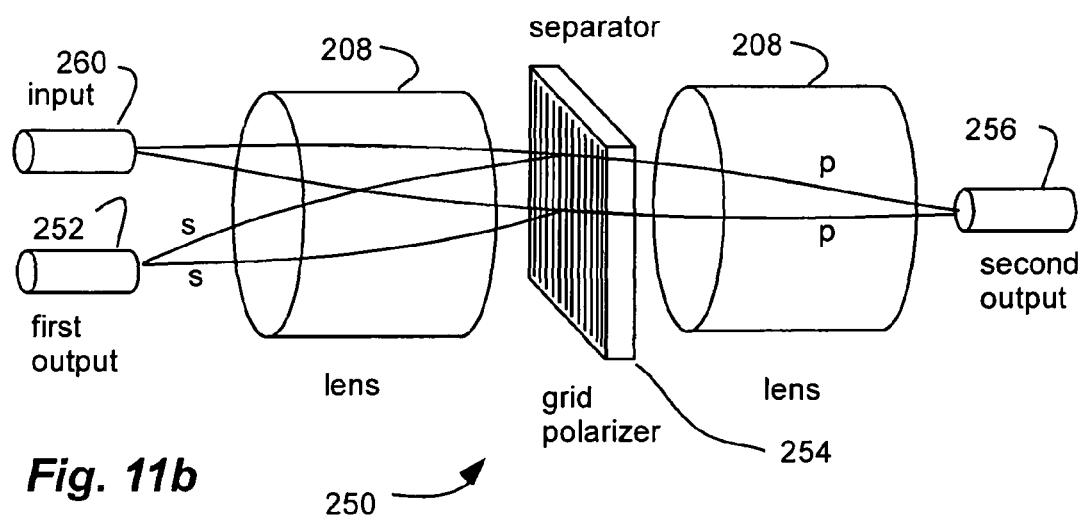
FIG. 11*b* is a schematic view of a separator with a polarizer device in accordance with an embodiment of the present invention.

Referring to FIG. 11b, a separator 250 is shown with a polarizer device 254. The separator 250 includes a polarizer device 254 as described above disposed between collimating/focusing lenses 208, such as graded index lenses, that can be oriented in a coaxial configuration so that their optical axes align to define an optical axis. First and second optical output fibers 252 and 256 are disposed on opposite sides of the combiner and oriented parallel to the optical axis. An optical input fiber 260 is disposed adjacent to the first output fiber 252 at an end of the lens and oriented parallel to the optical axis. The fibers can be polarizing maintaining fibers. The input fiber 260 can contain an unpolarized beam. The polarizer device 10b splits the beams into a reflected beam of s-polarization orientation directed towards the first output fiber, and a transmitted beam of p-polarization orientation directed towards the second output fiber.

Figure 12:
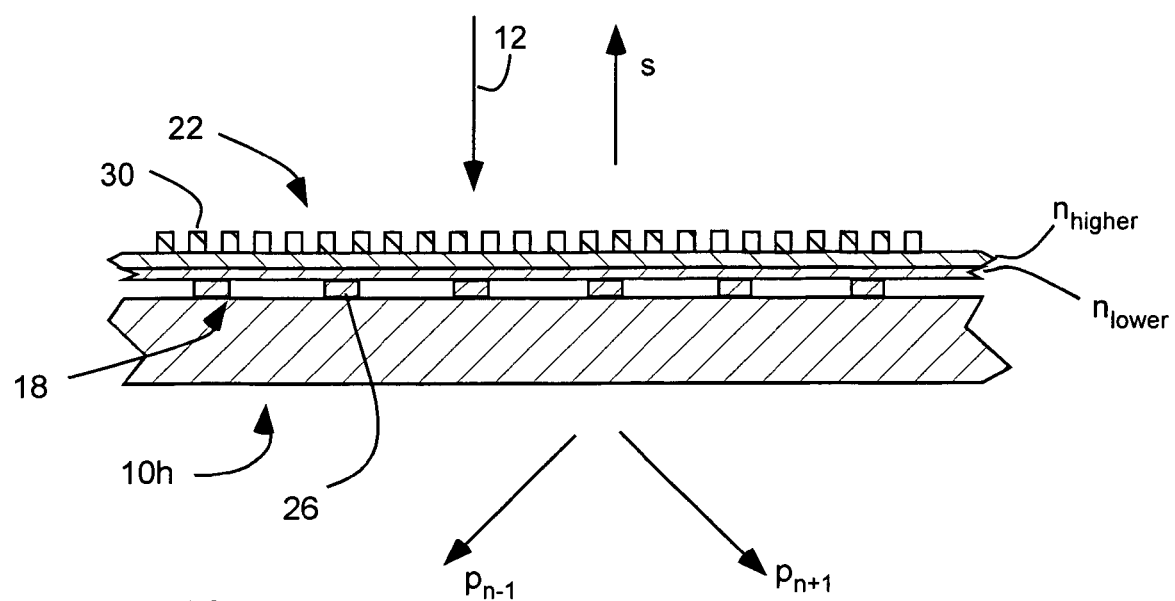
FIG. 12 is a cross-sectional side view of another polarizer device in accordance with another embodiment of the present invention.
Figure 13:
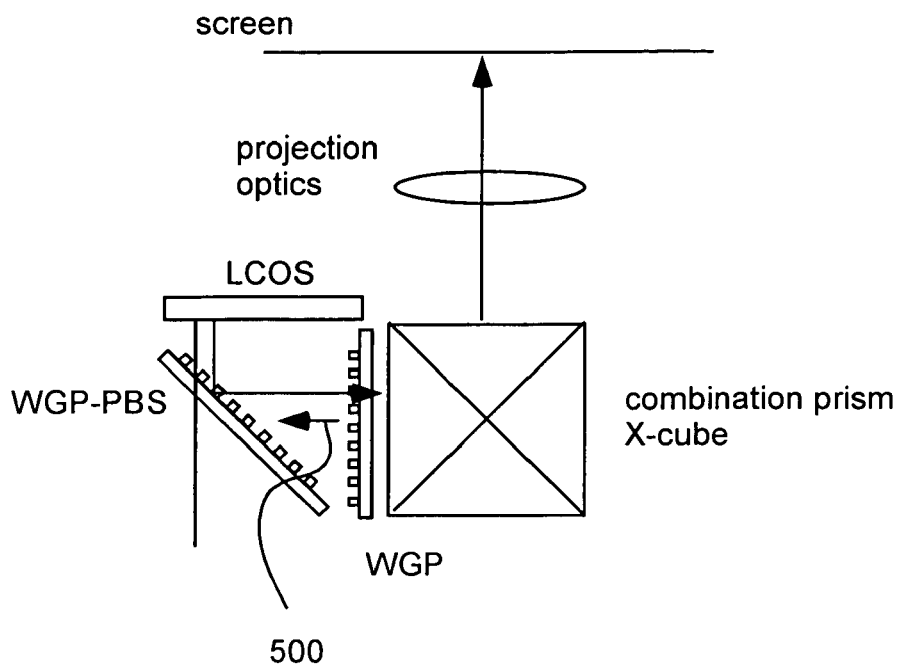
FIG. 13 is a schematic view of a prior art projection system.
Figure 14:
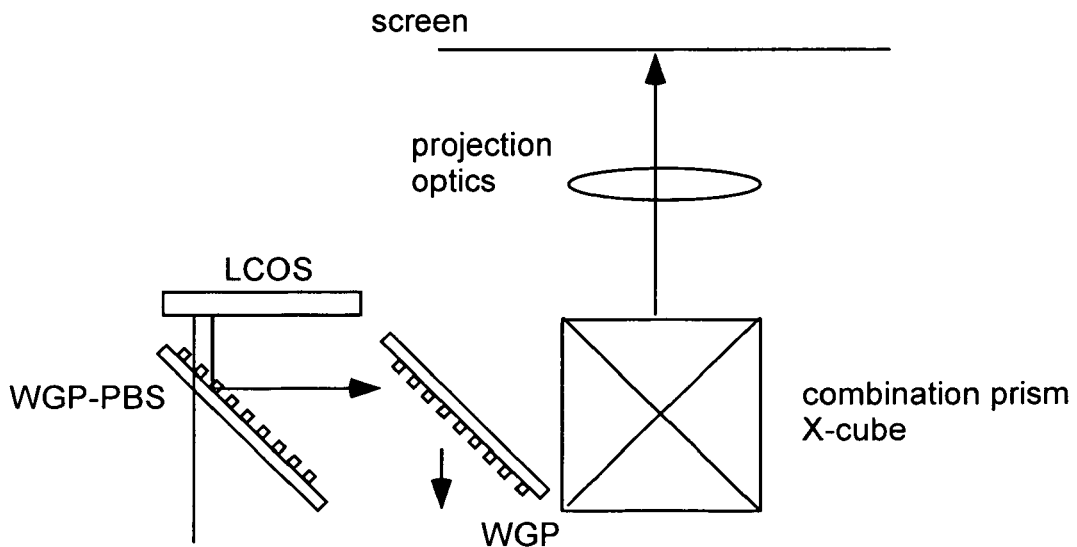
FIG. 14 is a schematic view of a proposed solution.

Referring to FIG. 12, another polarizer device 10h is shown that is similar to those described above, but is configured to control light in a different way, namely to split beams, split colors and/or steer beams. Specifically, the polarizer device 10h has a wire grid polarizer 22 disposed over a diffraction grating 18, opposite to that described above. Thus, in addition to substantially polarizing the incident light beam 12 (reflect light of s-polarization orientation and pass light of p-polarization orientation), the device 10h also diffracts or reflects the light of p-polarization orientation of non-zero order, and resists passing light of p-polarization orientation of zero-order. Thus, the device can be utilized to split the transmitted beam, split the transmitted beam into different colors, and/or steer or direct the transmitted beam.

It will be appreciated that a polarizer device as described above and shown in the Figures can be used in other applications, including for example, flat panel displays, optical data storage devices, light recyclers, etc.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A polarization device configured to polarize and further control light incident on the device, comprising:

an optical stack with a diffraction grating and a wire grid polarizer with one disposed over the other and configured to be disposed in the light, the wire grid polarizer including an array of elongated, parallel conductive wires in accordance with $P_{WGP} < \lambda/2$ where $P_{WGP}$ is a period of the wires and $\lambda$ is a wavelength of the light, to polarize the light by substantially reflecting light having an s-polarization orientation and substantially transmitting light having a p-polarization orientation, and the diffraction grating including an array of elongated parallel dielectric ribs in accordance with $P_{DG} > \lambda/2$ where $P_{DG}$ is a period of the ribs, to substantially diffract light with s-polarization orientation of non-zero order at a non-orthogonal angle, so that the diffraction grating and the wire grid polarizer together pass light having p-polarization orientation while diffracting light having s-polarization orientation.

2. A device in accordance with claim 1, wherein the period of the wires is less than about 0.21 microns; and wherein the period of the ribs is greater than 0.21 microns and less than 0.7 microns.

3. A device in accordance with claim 1, wherein the period of the diffraction grating is approximately five times greater than the period of the wire grid polarizer.

4. A device in accordance with claim 1, wherein the diffraction grating is stacked over the wire grid polarizer with the incident light incident on the diffraction grating; and wherein the diffraction grating diffracts reflected light with the s-polarization orientation of non-zero order.

5. A device in accordance with claim 1, wherein the wire grid polarizer is stacked over the diffraction grating with the incident light incident on the wire grid polarizer; and wherein the diffraction grating diffracts transmitted light with p-polarization.

6. A device in accordance with claim 1, further comprising:

a continuous layer disposed between the wire grid polarizer and the diffraction grating, and having a refractive index less than a refractive index of a supporting substrate.

7. A device in accordance with claim 1, further comprising:

at least two continuous layers disposed between the wire grid polarizer and the diffraction grating, including an upper layer with a refractive index greater than a refractive index of a lower layer.

8. A device in accordance with claim 7, wherein the lower layer extends into spaces between the wires of the wire grid polarizer.

9. A device in accordance with claim 1, wherein the array of conductive wires of the wire grid and the array of dielectric ribs of the diffraction grating are parallel with one another.

10. A device in accordance with claim 1, wherein the device substantially transmits light with p-polarization orientation and substantially diffracts light with s-polarization orientation of non-zero order, without substantially back reflecting light with s-polarization orientation of zero order.

11. A device in accordance with claim 1, wherein the ribs of the diffraction grating are split into two ribs.

12. A device in accordance with claim 1, further comprising an imaging system including:
- a spatial light modulator including a liquid crystal material; and
- a polarization beam splitter.

13. A polarization device configured to control light of a visible light beam having a wavelength between 0.4-0.7 microns incident on the device, comprising:
- an optical stack with a diffraction grating stacked over a wire grid polarizer, with the visible light beam incident on the diffraction grating at substantially an orthogonal orientation,
- the wire grid polarizer including an array of elongated, parallel conductive wires in accordance with $P_{WGP} < \lambda/2$ where $P_{WGP}$ is a period of the wires and $\lambda$ is the wavelength of the visible light beam, to polarize the visible light beam by substantially reflecting light having an s-polarization orientation and substantially transmitting light having a p-polarization orientation, and
- the diffraction grating including an array of elongated parallel dielectric ribs in accordance with $P_{DG} > \lambda/2$ where $P_{DG}$ is a period of the ribs, to substantially diffract light with s-polarization orientation of non-zero order at a non-orthogonal angle, so that the diffraction grating and the wire grid polarizer together pass light having p-polarization orientation while diffracting light having s-polarization orientation.

14. A device in accordance with claim 13, wherein the period of the diffraction grating is approximately five times greater than the period of the wire grid polarizer.

15. A device in accordance with claim 13, further comprising:
- a continuous layer disposed between the wire grid and the diffraction grating, and having a refractive index less than a refractive index of a supporting substrate.

16. A device in accordance with claim 13, further comprising:
- at least two continuous layers disposed between the wire grid polarizer and the diffraction grating, including an upper layer with a refractive index greater than a refractive index of a lower layer.

17. A device in accordance with claim 16, wherein the lower layer extends into spaces between the wires of the wire grid polarizer.

18. A device in accordance with claim 13, wherein the array of conductive wires of the wire grid and the array of dielectric ribs of the diffraction grating are parallel with one another.

19. A device in accordance with claim 13, wherein the device substantially transmits light with p-polarization orientation and substantially diffracts light with s-polarization orientation of non-zero order, without substantially back reflecting light with s-polarization orientation of zero order.

20. A device in accordance with claim 13, wherein the ribs of the diffraction grating are split into two ribs.

21. A device in accordance with claim 13, wherein the period of the wires is less than about 0.21 microns; and wherein the period of the ribs is greater than 0.21 microns and less than 0.7 microns.

22. A device in accordance with claim 13, further comprising an imaging system including:
- a spatial light modulator including a liquid crystal material; and
- a polarization beam splitter.

23. A method for polarizing a visible light beam while reducing back reflection and unwanted astigmatism in an optical path defined by the visible light beam, comprising:
- disposing a diffraction grating and wire grid polarizer stack in the optical path with the visible light beam incident on the diffraction grating, and
- orienting the stack substantially orthogonally with respect to the visible light beam incident on the diffraction grating,
- the wire grid polarizer substantially polarizing the visible light beam by substantially reflecting light having an s-polarization orientation and substantially transmitting light having a p-polarization orientation, with an array of elongated, parallel conductive wires with a period less than about 0.21 microns,
- the diffraction grating substantially diffracting light with s-polarization orientation having non-zero order at a non-orthogonal angle, with an array of elongated parallel dielectric ribs with a period greater than 0.21 microns, the diffraction grating and the wire grid polarizer together thereby passing light having p-polarization orientation while diffracting light having s-polarization orientation with non-zero order.

* * * * *